(12) United States Patent
Funakoshi et al.

(10) Patent No.: US 11,667,201 B2
(45) Date of Patent: Jun. 6, 2023

(54) ELECTROLYTE STATION AND ELECTRIC POWER MANAGEMENT SYSTEM

(71) Applicant: DENSO CORPORATION, Kariya (JP)

(72) Inventors: Hiroomi Funakoshi, Kariya (JP); Atsushi Nakajima, Kariya (JP)

(73) Assignee: DENSO CORPORATION, Kariya (JP)

( * ) Notice: Subject to any disclaimer, the term of this patent is extended or adjusted under 35 U.S.C. 154(b) by 599 days.

(21) Appl. No.: 16/715,168

(22) Filed: Dec. 16, 2019

(65) Prior Publication Data

US 2020/0189401 A1 Jun. 18, 2020

(30) Foreign Application Priority Data

Dec. 14, 2018 (JP) .............. JP2018-234607
Dec. 14, 2018 (JP) .............. JP2018-234608

(51) Int. Cl.
*H01M 8/04186* (2016.01)
*B60L 50/64* (2019.01)
(Continued)

(52) U.S. Cl.
CPC .............. *B60L 50/64* (2019.02); *B60L 53/14* (2019.02); *B60L 53/60* (2019.02); *B60L 53/65* (2019.02);
(Continued)

(58) Field of Classification Search
CPC .......... B60L 50/64; B60L 53/14; B60L 53/60; B60L 53/65; B60L 53/66; B60L 58/10; H01M 2250/20; H01M 8/04186; H01M 8/04201; H01M 8/04276; H01M 8/188; Y02E 60/50; Y02T 10/70; Y02T 10/7072; Y02T 90/12; Y02T 90/14; Y02T 90/16; Y02T 90/167; Y02T 90/169; Y02T 90/40; Y04S 30/14
See application file for complete search history.

(56) References Cited

U.S. PATENT DOCUMENTS

2002/0076581 A1* 6/2002 McCoy ................ H01M 50/77
429/70
2004/0249516 A1 12/2004 Seto et al.
(Continued)

FOREIGN PATENT DOCUMENTS

| JP | 2011-83166 A | 4/2011 |
| JP | 2011-233371 A | 11/2011 |
| JP | 2015-49969 A | 3/2015 |

*Primary Examiner* — Victoria H Lynch
(74) *Attorney, Agent, or Firm* — Oliff PLC

(57) ABSTRACT

An electrolyte station is used for electrolyte replacement in a redox flow battery that is mounted to a vehicle. The electrolyte station includes: a stand that includes a connector that connects to a connection socket that connects to an electrolyte tank in the redox flow battery; a recovery tank that stores a recovered electrolyte; a filling tank that stores a charged electrolyte; a recovery line that connects the connector in the stand and the recovery tank; and a filling line that connects the connector in the stand and the filling tank. In response to the connector being connected to the connection socket, the electrolyte station enables the used electrolyte removed from an electrolyte tank to be recovered to the recovery tank through the recovery line, and enables the charged electrolyte stored in the filling tank to be supplied the electrolyte tank through the filling line.

19 Claims, 21 Drawing Sheets

(51) Int. Cl.
  *H01M 8/18*    (2006.01)
  *H01M 8/04082* (2016.01)
  *B60L 53/14*   (2019.01)
  *B60L 58/10*   (2019.01)
  *G01C 21/34*   (2006.01)
  *B60L 53/65*   (2019.01)
  *B60L 53/66*   (2019.01)
  *B60L 53/60*   (2019.01)

(52) U.S. Cl.
  CPC ............... *B60L 53/66* (2019.02); *B60L 58/10* (2019.02); *G01C 21/3476* (2013.01); *H01M 8/04186* (2013.01); *H01M 8/04201* (2013.01); *H01M 8/188* (2013.01); *H01M 2250/20* (2013.01)

(56) References Cited

U.S. PATENT DOCUMENTS

| | | |
|---|---|---|
| 2010/0323264 A1 | 12/2010 | Chiang et al. |
| 2015/0129081 A1 | 5/2015 | Chiang et al. |
| 2016/0013507 A1 | 1/2016 | Chiang et al. |
| 2016/0268621 A1 | 9/2016 | Chiang et al. |
| 2017/0301942 A1* | 10/2017 | Martin .............. H01M 8/04664 |
| 2020/0366104 A1* | 11/2020 | Stanfield ................. B60L 53/31 |

* cited by examiner

ELECTROLYTE STATION AND ELECTRIC POWER MANAGEMENT SYSTEM

CROSS-REFERENCE TO RELATED APPLICATION

This application is based on and claims the benefit of priority from Japanese Patent Application No. 2018-234608, filed Dec. 14, 2018 and Japanese Patent Application No. 2018-234607, filed Dec. 14, 2018. The entire disclosures of the above applications are incorporated herein by reference.

BACKGROUND

Technical Field

The present disclosure relates to a technology for electrolyte replacement in a redox flow battery that is mounted to a vehicle. The present disclosure also relates to a technology for managing energy supply to an electric vehicle to which a redox flow battery is mounted.

Related Art

A fuel system using a redox flow battery is known. In this fuel system, a first usage aspect and a second usage aspect are used. In the first usage aspect, a redox flow battery that is mounted to a vehicle is recharged by being connected to a power supply at a station. In the second usage aspect, energy exchange is performed by a fuel tank of the redox flow battery being emptied and a new electrolyte being fed thereto, or a used fuel tank being replaced with a new fuel tank at a station.

SUMMARY

An electrolyte station is used for electrolyte replacement in a redox flow battery that is mounted to a vehicle. The electrolyte station includes: a stand that includes a connector that connects to a connection socket that connects to an electrolyte tank in the redox flow battery; a recovery tank that stores a recovered electrolyte; a filling tank that stores a charged electrolyte; a recovery line that connects the connector in the stand and the recovery tank; and a filling line that connects the connector in the stand and the filling tank. In response to the connector being connected to the connection socket, the electrolyte station enables the used electrolyte removed from an electrolyte tank to be recovered to the recovery tank through the recovery line, and enables the charged electrolyte stored in the filling tank to be supplied the electrolyte tank through the filling line.

DESCRIPTION OF THE EMBODIMENTS

Figure 1:
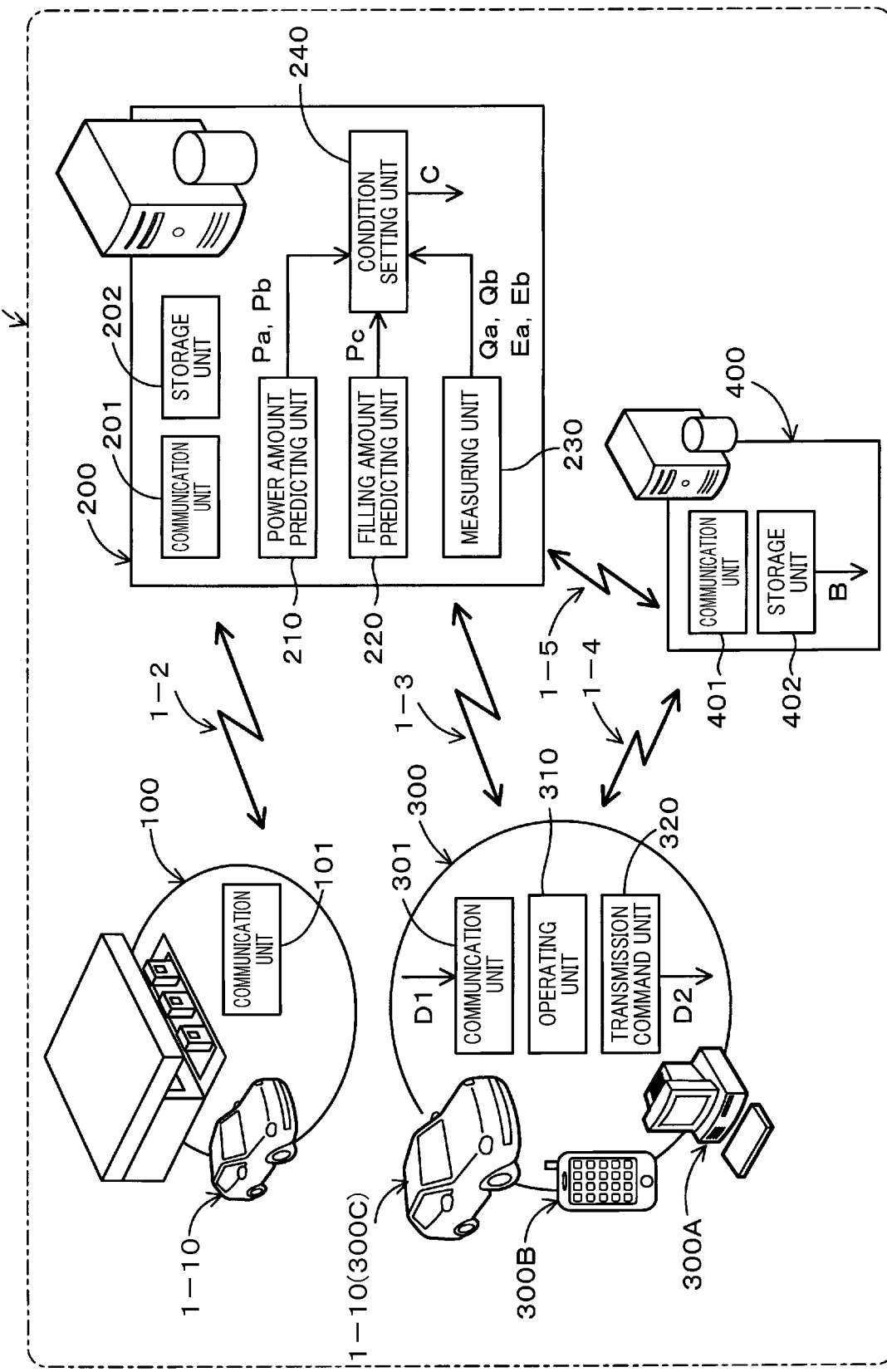
FIG. 1 is a system configuration diagram of an electric power management system that includes an electrolyte station according to a first embodiment.

JP-A-2012-523103 discloses a fuel system using a redox flow battery. In this fuel system, a first usage aspect and a second usage aspect are used. In the first usage aspect, a redox flow battery that is mounted to a vehicle is recharged by being connected to a power supply at a station. In the second usage aspect, energy exchange is performed by a fuel tank of the redox flow battery being emptied and a new electrolyte being fed thereto, or a used fuel tank being replaced with a new fuel tank at a station.

In the above-described fuel system, whereas time is required for the redox flow battery to be recharged in the first usage aspect, the second usage aspect involves only the operation of feeding the electrolyte to the fuel tank or the operation of replacing the fuel tank itself. The amount of required time can be shortened in the second usage aspect. Therefore, the second usage aspect is advantageous.

However, the second usage aspect is problematic in that the above-described feeding operation or replacement operation is accompanied by an operation of attaching and detaching the fuel tank to and from the vehicle. Therefore, the second usage aspect is less convenient.

It is thus desired to provide a technology that is effective in facilitating electrolyte replacement in a redox flow battery that is mounted to a vehicle.

Japanese Patent Publication No. 4538203 discloses an energy management apparatus that manages the transfer of energy between a plurality of energy-related systems.

In the energy management apparatus, whether an amount of energy that is required to charge the electric vehicle is held, whether energy is required to be newly generated to charge the electric vehicle, and the like are determined. A user is then notified of the determination result. Therefore, the user of the electric vehicle can select an energy supply source for the electric vehicle based on the presented determination result.

However, in the above-described energy management apparatus, although charging of an electric vehicle is described, electrolyte replacement in a redox flow battery for an electric vehicle to which a redox flow battery is mounted is not discussed. Here, when electrolyte replacement in a redox flow battery is assumed, a technology for managing the transfer of energy between a plurality of energy supply stations including an electrolyte station is desired.

It is thus desired to provide a technology that is effective in managing energy supply to an electric vehicle to which a redox flow battery is mounted.

A first exemplary embodiment of the present disclosure provides an electrolyte station for performing electrolyte replacement of a redox flow battery that is mounted to a vehicle. The electrolyte station includes: a stand that includes a connector that is capable of connecting to a connection socket that connects to an electrolyte tank in the redox flow battery; a recovery tank that stores a recovered electrolyte; a filling tank that stores a charged electrolyte; a recovery line that connects the connector in the stand and the recovery tank; and a filling line that connects the connector in the stand and the filling tank. In response to the connector in the stand being connected to the connection socket, the electrolyte station enables the used electrolyte removed from the electrolyte tank to be recovered to the recovery tank through the recovery line, and enables the charged electrolyte stored in the filling tank to be supplied the electrolyte tank through the filling line.

In the above-described electrolyte station, the used electrolyte that is removed from the electrolyte tank can be recovered to the recovery tank through the recovery line in a state in which the connector of the stand is connected to the connection socket by the user. In addition, the charged electrolyte can fill the electrolyte tank through the filling line. In this case, an operation for electrolyte replacement in the electrolyte tank of the redox flow battery is a simple operation that mainly involves the connector in the stand being connected to the connection socket.

As described above, according to the above-described exemplary embodiment, electrolyte replacement in the redox flow battery that is mounted to a vehicle can be facilitated.

A second exemplary embodiment of the present disclosure provides an energy management apparatus that manages energy supply to an electric vehicle to which a redox flow battery is mounted. The energy management apparatus includes: a receiving unit that receives an information request command from a terminal apparatus; an extracting unit that extracts presented information based on both vehicle information related to the electric vehicle and facility information related to a plurality of energy supply stations that include a plurality of electrolyte stations that are capable of performing electrolyte replacement in the redox flow battery, in response to reception of the information request command by the receiving unit; and a transmitting unit that transmits the presented information extracted by the extracting unit to the terminal apparatus.

A third exemplary embodiment of the present disclosure provides a terminal apparatus that acquires presented information regarding energy supply to an electric vehicle to which a redox flow battery is mounted. The presented information is extracted based on both vehicle information related to the electric vehicle and facility information related to a plurality of energy supply stations that include a plurality of electrolyte stations that are capable of performing electrolyte replacement in the redox flow battery. The terminal apparatus includes: a transmitting unit that transmits an information request command requesting the presented information to the energy management apparatus; and a receiving unit that receives the presented information that is transmitted from the energy management apparatus in response to the information request command.

A fourth exemplary embodiment of the present disclosure provides an energy management method for managing energy supply to an electric vehicle to which a redox flow battery is mounted. The energy management method includes: a receiving step of receiving an information request command from a terminal apparatus; an extracting step of extracting presented information based on both vehicle information related to the electric vehicle and facility information related to a plurality of energy supply stations that include a plurality of electrolyte stations that are capable of performing electrolyte replacement in the redox flow battery, in response to reception of the information request command at the receiving step; and a transmitting step of transmitting the presented information extracted at the extracting step to the terminal apparatus.

In the above-described energy management apparatus, the receiving unit receives the information request command from the terminal apparatus. In addition, the extracting unit extracts the presented information that can be referenced during use of the plurality of energy supply stations, based on reception of the information request command by the receiving unit. The presented information extracted by the extracting unit is then transmitted to the terminal apparatus by the transmitting unit.

Here, the "presented information" is extracted based on the vehicle information related to the electric vehicle and the facility information related to the plurality of energy supply stations that include the plurality of electrolyte stations that are capable of performing electrolyte replacement in the redox flow battery. Therefore, the presented information that is suitable for the vehicle to which the redox flow battery is mounted is presented in the terminal apparatus, taking into consideration both the conditions on the electric vehicle side and the state on the energy supply station side. The presented information that is presented in the terminal apparatus can be referenced during energy supply to the electric vehicle.

In the above-described terminal apparatus, in response to the information request command requesting the presented information being transmitted to the energy management apparatus, the presented information corresponding to the information request command is transmitted from the energy management apparatus. Therefore, the presented information suitable for energy supply to the electric vehicle can be referenced through the terminal apparatus.

In the above-described energy management method, when the information request command is received from the terminal apparatus at the receiving step, the presented information is transmitted to the terminal apparatus at the transmitting step, after the presented information is extracted at the extracting step. Therefore, the presented information can be transmitted to the terminal apparatus in response to the information request command being received from the terminal apparatus.

As described above, according to the above-described exemplary embodiments, energy supply to an electric vehicle to which a redox flow battery is mounted can be managed.

First and second embodiments will hereinafter be described with reference to FIG. 1 to FIG. 16. The first and second embodiments relate to an electrolyte station and an electric power management system.

First Embodiment

As shown in FIG. 1, an electric power management system 1-1 according to a first embodiment includes, as constituent elements, an electrolyte station 100, a management apparatus 200, and a terminal apparatus 300. The management apparatus 200 and the terminal apparatus 300 are provided separately from the electrolyte station 100.

Here, in FIG. 1, one of each of the above-described constituent elements is shown for the convenience of description. However, the quantities of the above-described constituent elements can be changed as appropriate. In addition, other constituent elements may be added to the above-described constituent elements as required.

The electrolyte station 100 is used for electrolyte replacement in a redox flow battery A11 (see FIG. 2) that is mounted to a vehicle A10. The electrolyte station 100 may be a dedicated station that performs only replacement of the electrolyte. Alternatively, the electrolyte station 100 may be a dual-purpose station that also performs supply of another type of energy.

The electrolyte station 100 includes a communication unit 101. The communication unit 101 is capable of communicating information with a communication unit 201 of the management apparatus 200, via a communication line 1-2. The communication unit 101 is capable of transmitting transmission information to the management apparatus 200 via the communication line 1-2. In addition, the communication unit 101 is capable of receiving reception information from the management apparatus 200 via the communication line 2.

The management apparatus 200 manages a plurality of energy supply stations including the electrolyte station 100. The management apparatus 200 includes the communication unit 201, a storage unit 202, a power amount predicting unit 210, a filling amount predicting unit 220, a measuring unit 230, and a condition setting unit 240.

The power amount predicting unit 210 provides a function for predicting an input power amount Pa and an output power amount Pb based on the information transmitted from the communication unit 101 of the electrolyte station 100. The prediction results regarding the input power amount Pa and the output power amount Pb from the power amount predicting unit 210 are temporarily stored in the storage unit 202. The prediction results are then read from the storage unit 202 as required.

The filling amount predicting unit 220 provides a function for predicting a filling amount Pc based on the information transmitted from the communication unit 101 of the electrolyte station 100. The prediction result regarding the filling amount Pc from the filling amount predicting unit 220 is temporarily stored in the storage unit 202. The prediction result is then read from the storage unit 202 as required.

The measuring unit 230 provides a function for measuring liquid amounts Qa and Qb, and energy amounts Ea and Eb based on the information transmitted from the communication unit 101 of the electrolyte station 100. The measurement results regarding the liquid amounts Qa and Qb, and the energy amounts Ea and Eb from the measuring unit 230 are temporarily stored in the storage unit 202. The measurement results are then read from the storage unit 202 as required.

The condition setting unit 240 provides a function for setting an electrolyte replacement condition C based on both the respective prediction results from the power amount predicting unit 210 and the filling amount predicting unit 220, and the measurement results from the measuring unit 230.

The condition setting unit 240 reads out each of the parameters, that is, the input power amount Pa, the output power amount Pb, the filling amount Pc, the liquid amounts Qa and Qb, and the energy amounts Ea and Eb that are temporarily stored in the storage unit 202. The condition setting unit 204 then sets the electrolyte replacement condition C by applying these parameters to logic that is set in advance.

The terminal apparatus 300 is connected to the management apparatus 200 so as to be capable of communicating information via a communication line 1-3. The terminal apparatus 300 includes a stationary terminal 300A, a portable terminal 300B, an onboard apparatus 300C, and the like.

Here, the stationary terminal 300A is an apparatus that can be used by a user in an installed state. A large-sized personal computer that is not expected to be carried typically corresponds to the stationary terminal 300A.

The portable terminal 300B is a compact, light-weight mobile apparatus that can be carried and used by a user. A portable mobile phone (including smartphone), a tablet-type information terminal, and a laptop-type personal computer typically correspond to the portable terminal 300B.

The onboard apparatus 300C is mounted to the vehicle A10. An apparatus that is arranged as appropriate in an instrument panel, a console, a steering wheel, an electronic control unit (ECU), or the like of the vehicle A10 typically corresponds to the onboard apparatus 300C.

The "user" herein widely includes not only an individual owner who owns the vehicle A10, but also a business operator that owns a plurality of vehicles A10 for purposes such as a rental business or a car-sharing business, and the like.

The terminal apparatus 300 includes a communication unit 301, an operating unit 310, and a transmission command unit 320. The communication unit 301 is capable of communicating information with the communication unit 201 of the management apparatus 200 via the communication line 1-3. The operating unit 310 can be operated by the user when a plurality of energy supply stations are used.

The communication unit 301 is capable of transmitting transmission information to the management apparatus 200 via the communication line 1-3. In addition, the communication unit 301 is capable of receiving reception information from the management apparatus 200 via the communication line 1-3.

The operating unit 310 can be used by the user to enable the user to select the energy supply station to be used among a plurality of energy supply stations. When the operating unit 310 is operated by the user, the communication unit 301 receives an information output request D1 from the management apparatus 200 via the communication line 2.

The transmission command unit 320 provides a function for outputting a transmission command D2 to transmit vehicle information B to the management apparatus 200 in response to the information output request D1 received by the communication unit 301. The transmission command unit 320 is connected to a communication unit 401 of a vehicle information management server 400 so as to be capable of communicating information via a communication line 1-4.

The vehicle information management server 400 includes the communication unit 401 and a storage unit 402. The storage unit 402 stores a plurality of pieces of vehicle information B therein.

Here, the vehicle information B is information that is related to a plurality of vehicles 1-10 that are managed by the user and to which the redox flow battery 1-11 (see FIG. 2) is mounted. The vehicle information B includes information on the vehicle 1-10, such as a vehicle name, a vehicle body number, and a model type. The vehicle information B also includes information such as a current stopping position or traveling position of the vehicle 1-10, and a remaining energy amount of an electrolyte tank 1-12 in the redox flow battery 1-11.

The transmission command unit 320 outputs the transmission command D2 to the vehicle information management server 400 such that the vehicle information B that is stored in advance in the storage unit 402 of the vehicle information management server 400 is transmitted to the management apparatus 200 via a communication line 1-5, in response to the operating unit 310 being operated by the user.

Here, an aspect in which the functions of the storage unit 402 of the vehicle information management server 400 are provided by either of the management apparatus 200 and the terminal apparatus 300, an aspect in which the vehicle information management server 400 itself is provided in either of the management apparatus 200 and the terminal apparatus 300, or the like can also be used.

Figure 2:
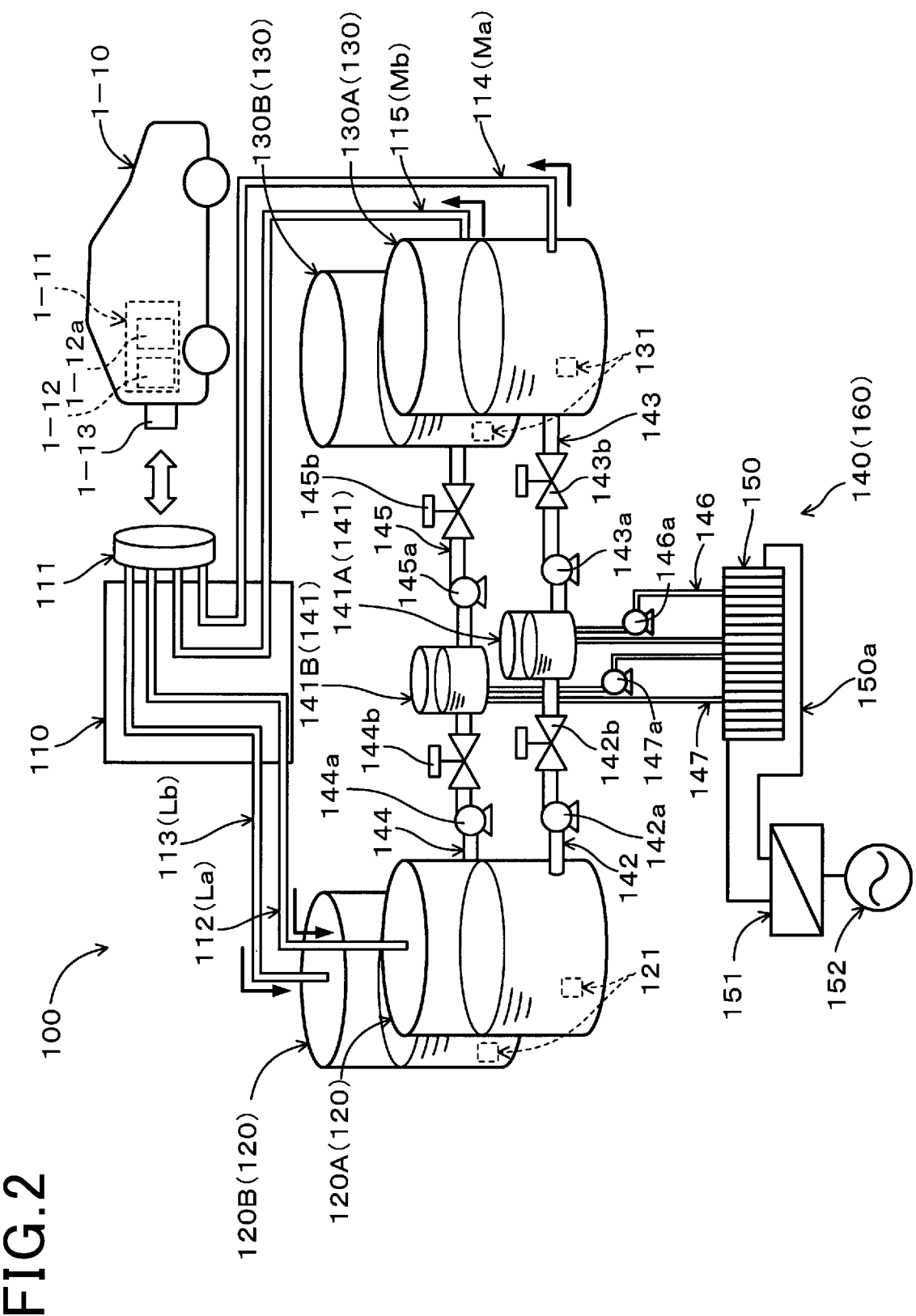
FIG. 2 is a diagram of an overall configuration of the electrolyte station according to the first embodiment.

As shown in FIG. 2, the electrolyte station 100 includes a stand 110, two recovery tanks 120, two filling tanks 130, two recovery lines (flow passages) 112 and 113, two filling lines (flow passages) 114 and 115, and a charging processing apparatus 140.

The stand 110 includes a connector 111 that is used for electrolyte replacement. The connector 111 can be connected to a connection socket (connection opening) 1-13 that is connected to the electrolyte tank 1-12 of the redox flow battery 1-11. Respective one end portions of the two recovery lines 112 and 113 and respective one end portions of the two filling lines 114 and 115 are provided inside the connector 111.

In addition, although not particularly shown in FIG. 2, a recovery pump and a filling pump are provided inside the stand 110. The recovery pump is used to send an electrolyte through the two recovery lines 112 and 113 towards the recovery tank 120. The filling pump is used to send an electrolyte through the two filling lines 114 and 115 towards the connector 111.

The redox flow battery 1-11 that is mounted to the vehicle 1-10 includes a reaction tank 1-12a, and a positive-terminal and negative-terminal electrolyte tank 1-12. The reaction tank 1-12a is partitioned into an anode-side electrolytic tank and a cathode-side electrolytic tank by an ion-exchange film. The electrolyte tank 1-12 stores an electrolyte that is supplied to the reaction tank 1-12a. The redox flow battery 1-11 is capable of discharging electric power that is generated in the redox flow battery 1-11. The redox flow battery 1-11 is also capable of charging external electric power. In the redox flow battery 1-11, the reaction tank 1-12a provides functions that are similar to those of a cell stack 150, described hereafter. The electrolyte tank 1-12 provides functions that are similar to those of a charging tank 141, described hereafter.

Regarding a more detailed structure of the redox flow battery 1-11, for example, refer to the structures of the redox flow battery disclosed in JP-A-2011-233371 and JP-A-2012-523103.

The two recovery tanks 120 are classified into a recovery tank 120A and a recovery tank 120B. The recovery tank 120A stores a recovered electrolyte La in an anode-side electrolytic tank (not shown) of the electrolyte tank 1-12. The recovery tank 120B stores a recovered electrolyte Lb in a cathode-side electrolytic tank (not shown) of the electrolyte tank 1-12.

A sensor apparatus 121 is attached to each of the two recovery tanks 120. The sensor apparatus 121 includes a first sensor and a second sensor. The first sensor acquires data for measurement of the liquid amount Qa of the electrolyte that is stored in the recovery tank 120. The second sensor acquires data for measurement of the energy amount Ea of the electrolyte that is stored in the recovery tank 120. The pieces of data that are acquired by the sensors of the sensor apparatus 121 are transmitted to the management apparatus 200.

The two filling tanks 130 are classified into a filling tank 130A and a filling tank 130B. The filling tank 130A stores a charged electrolyte Ma that fills the anode-side electrolytic tank (not shown) of the electrolyte tank 1-12. The filling tank 130B stores a charged electrolyte Mb that fills the cathode-side electrolytic tank (not shown) of the electrolyte tank 1-12.

A sensor apparatus 131 that is similar to the above-described sensor apparatus 121 is attached to each of the two filling tanks 130. The sensor apparatus 131 includes a first sensor and a second sensor. The first sensor acquires data for measurement of the liquid amount Qb of the electrolyte that is stored in the filling tank 130. The second sensor acquires data for measurement of the energy amount Eb of the electrolyte that is stored in the filling tank 130. The pieces of data that are acquired by the sensors of the sensor apparatus 131 are transmitted to the management apparatus 200.

As the first sensors of the sensor apparatuses 121 and 131, a capacitive level indicator, a float-type level indicator, an ultrasonic level indicator, a pressure-type level indicator, or the like can be typically used.

As the second sensors of the sensor apparatuses 121 and 131, a pH sensor can be typically used. When the pH sensor is used as the second sensor, the energy amount Ea per unit liquid amount of the electrolyte can be estimated from a pH value that is detected by the pH sensor.

Here, the energy amount Eb can be derived by an estimation value of electric power that is supplied to the cell stack 150 being added to the energy amount Ea that is estimated by the second sensor of the sensor apparatus 121. In this case, the second sensor of the sensor apparatus 131 can be omitted.

The recovery line 112 connects the connector 111 of the stand 110 and the recovery tank 120A. Therefore, in a state in which the connector 111 of the stand 110 is connected to the connection socket 1-13, the used electrolyte La that is removed from the electrolyte tank 1-12 is recovered into the recovery tank 120A from the connector 111 through the recovery line 112.

The recovery line 113 connects the connector 111 of the stand 110 and the recovery tank 120B. Therefore, in a state in which the connector 111 of the stand 110 is connected to the connection socket 1-13, the used electrolyte Lb that is removed from the electrolyte tank 1-12 is recovered into the recovery tank 120B from the connector 111 through the recovery line 113.

The filling line 114 connects the connector 111 of the stand 110 and the filling tank 130A. Therefore, in a state in which the connector 111 of the stand 110 is connected to the connection socket 1-13, the charged electrolyte Ma that is stored in the filling tank 130A fills the electrolyte tank 1-12 through the filling line 114 and the connector 111.

The filling line 115 connects the connector 111 of the stand 110 and the filling tank 130B. Therefore, in a state in which the connector 111 of the stand 110 is connected to the connection socket 1-13, the charged electrolyte Mb that is stored in the filling tank 130B fills the electrolyte tank 1-12 through the filling line 115 and the connector 111.

Here, the recovery lines 112 and 113, and the filling lines 114 and 115 are paths that are independent of one another. Therefore, in a state in which the connector 111 of the stand 110 is connected to the connection socket 1-13 of the vehicle 1-10, a recovery operation of the used electrolytes La and Lb can be performed using the recovery lines 112 and 113, and a filling operation of the charged electrolytes Ma and Mb can be performed using the filling lines 114 and 115, in parallel. As a result, an amount of time required for an electrolyte replacement operation can be shortened.

Here, a structure in which at least one line among the four lines 112, 113, 114, and 115 is also used as a portion or the entirety of another line can also be used as required.

In addition, the connector 111 may be divided into a first connector and a second connector. The first connector is used for the two recovery lines 112 and 113. The second connector is used for the two filling lines 114 and 115.

The charging processing apparatus 140 is capable of performing a charging process for charging the used electrolytes La and Lb that are stored in the recovery tanks 120A and 120B. The electrolyte that has been subjected to the charging process by the charging processing apparatus 140 is stored in the filling tanks 130A and 130B as the charged electrolytes Ma and Mb.

The charging processing apparatus 140 includes two charging tanks 141, the cell stack 150, a charger-discharger 151, and a control unit 160.

The control unit 160 provides a function for controlling transfer pumps 142a, 143a, 144a, and 145a, circulation pumps 146a and 147a, and on-off valves 142b, 143b, 144b, and 145b, based on the electrolyte replacement condition C. The electrolyte replacement condition C is set such that the used electrolytes La and Lb are recovered from the redox flow battery 1-11 and the redox flow battery 1-11 is filled with the charged electrolytes Ma and Mb.

The electrolyte replacement condition C is set by the condition setting unit 240 of the management apparatus 200. The electrolyte replacement condition C is then transmitted from the communication unit 201 and received by the communication unit 101. When the electrolyte replacement condition C is set, the input power amount Pa, the output power amount Pb, and the filling amount Pc are predicted, and the liquid amounts Qa and Qb, and the energy amounts Ea and Eb are measured in the management apparatus 200, based on the information transmitted from the communication unit 101 of the electrolyte station 100.

Here, the input power amount Pa is an amount of electric power that is inputted to the charger-discharger 151 from a system power supply 152 that is an external connection subject. The output power amount Pb is an amount of electric power that is outputted to the system power supply 152 from the charger-discharger 151. The filling amount Pc is a filling amount of the charged electrolytes Ma and Mb that fill the electrolyte tank 1-12 of the redox flow battery 1-11 from the filling tanks 130A and 130B.

In addition, the liquid amount Qa is a liquid amount of the used electrolytes La and Lb that are stored in the recovery tanks 120A and 120B. The liquid amount Qb is a liquid amount of the charged electrolytes Ma and Mb that are stored in the filling tanks 130A and 130B. The energy amount Ea is an energy amount of the used electrolytes La and Lb that are stored in the recovery tanks 120A and 120B. The energy amount Eb is an energy amount of the charged electrolytes Ma and Mb that are stored in the filling tanks 130A and 130B.

The two charging tanks 141 are classified into a charging tank 141A and a charging tank 141B. The charging tank 141A is respectively connected to the recovery tank 120A and the filling tank 130A by connection pipes 142 and 143. The charging tank 141B is respectively connected to the recovery tank 120B and the filling tank 130B via connection pipes 144 and 145.

The capacities of the charging tanks 141A and 141B are preferably set to a value that is expressed as a multiple or a divisor of the capacity of the electrolyte tank 1-12 of the redox flow battery 1-11. More preferably, the capacities of the charging tanks 141A and 141B are set to a value that is similar to the capacity of the electrolyte tank 1-12. As a result, a significant increase in electric power that is required when the electrolytes in the charging tanks 141A and 141B are charged can be suppressed.

In addition, the capacities of the charging tanks 141A and 141B are preferably set to a value that is less than the capacity of any of the recovery tanks 120A and 120B, and the filling tanks 130A and 130B. As a result, the charging processing apparatus 140 including the charging tanks 141A and 141B can be reduced in size.

The connection pipe 142 connects the recovery tank 120A and the charging tank 141A. The electrolyte can be transferred between the recovery tank 120A and the charging tank 141A through the connection pipe 142.

The electrolyte can be transferred from the recovery tank 120A to the charging tank 141A or from the charging tank 141A to the recovery tank 120A by the on-off valve 142b being controlled to an open state by the control unit 160 and the transfer pump 142a being operated. In addition, the flow of electrolyte between the recovery tank 120A and the charging tank 141A is blocked by the on-off valve 142b being controlled to a closed state by the control unit 160.

The connection pipe 143 connects the charging tank 141A and the filling tank 130A. The electrolyte can be transferred between the charging tank 141A and the filling tank 130A through the connection pipe 143.

The electrolyte can be transferred from the charging tank 141A to the filling tank 130A or from the filling tank 130A to the charging tank 141A by the on-off valve 143b being controlled to an open state by the control unit 160 and the transfer pump 143a being operated. In addition, the flow of electrolyte between the charging tank 141A and the filling tank 130A is blocked by the on-off valve 143b being controlled to a closed state by the control unit 160.

The connection pipe 144 connects the recovery tank 120B and the charging tank 141B. The electrolyte can be transferred between the recovery tank 120B and the charging tank 141B through the connection pipe 144.

The electrolyte can be transferred from the recovery tank 120B to the charging tank 141B or from the charging tank 141B to the recovery tank 120B by the on-off valve 144b being controlled to an open state by the control unit 160 and the transfer pump 144a being operated. In addition, the flow of electrolyte between the recovery tank 120B and the charging tank 141B is blocked by the on-off valve 144b being controlled to a closed state by the control unit 160.

The connection pipe 145 connects the charging tank 141B and the filling tank 130B. The electrolyte can be transferred between the charging tank 141B and the filling tank 130B through the connection pipe 145.

The electrolyte can be transferred from the charging tank 141B to the filling tank 130B or from the filling tank 130B to the charging tank 141B by the on-off valve 145b being controlled to an open state by the control unit 160 and the transfer pump 145a being operated. In addition, the flow of electrolyte between the charging tank 141B and the filling tank 130B is blocked by the on-off valve 145b being controlled to a closed state by the control unit 160.

The cell stack 150 is a known reaction tank that is composed of an assembly of a plurality of cells that are capable of generating or absorbing electric power, similar to the redox flow battery 1-11. The cell stack 150 is capable of circulating the electrolyte between the charging tanks 141A and 141B through circulation paths 146 and 147. The circulation pumps 146a and 147a are provided on the circulation paths 146 and 147.

As a result, during operation of the circulation pump 146a, the electrolyte circulates through the circulation path 146 that connects the charging tank 141A and the cell stack 150. In addition, during operation of the circulation pump 146b, the electrolyte circulates through the circulation path 147 that connects the charging tank 141B and the cell stack 150. At this time, in the cell stack 150, electric power can be outputted through use of the electrolyte, or the electrolyte can be charged by input of electric power.

The charger-discharger 151 is configured as a charger-discharger for system power that is interposed between the system power supply 152 and the cell stack 150 on an energization path 150a. Therefore, the charger-discharger 151 is capable of performing charging and discharge with the system power supply 152 through the energization path 150a.

As a result of the electrolyte being circulated through the circulation paths 146 and 147 in a power input state in which electric power is inputted from the system power supply 152 to the charger-discharger 151, the electric charge of the electrolyte increases. Therefore, as a result of circulation of the electrolyte being continued in the power input state, liquid charging of the electrolyte in the charging tanks 141A and 141B can be performed.

Meanwhile, electric power that is stored in the cell stack 150 can be outputted to the system power supply 152 through the energization path 150a and the charger-discharger 151.

Next, a flow of control in the electrolyte station 100 will be described with reference to FIG. 3 to FIG. 9. This flow of control is performed in the electrolyte station 100 based on a command from the management apparatus 200.

Figure 3:
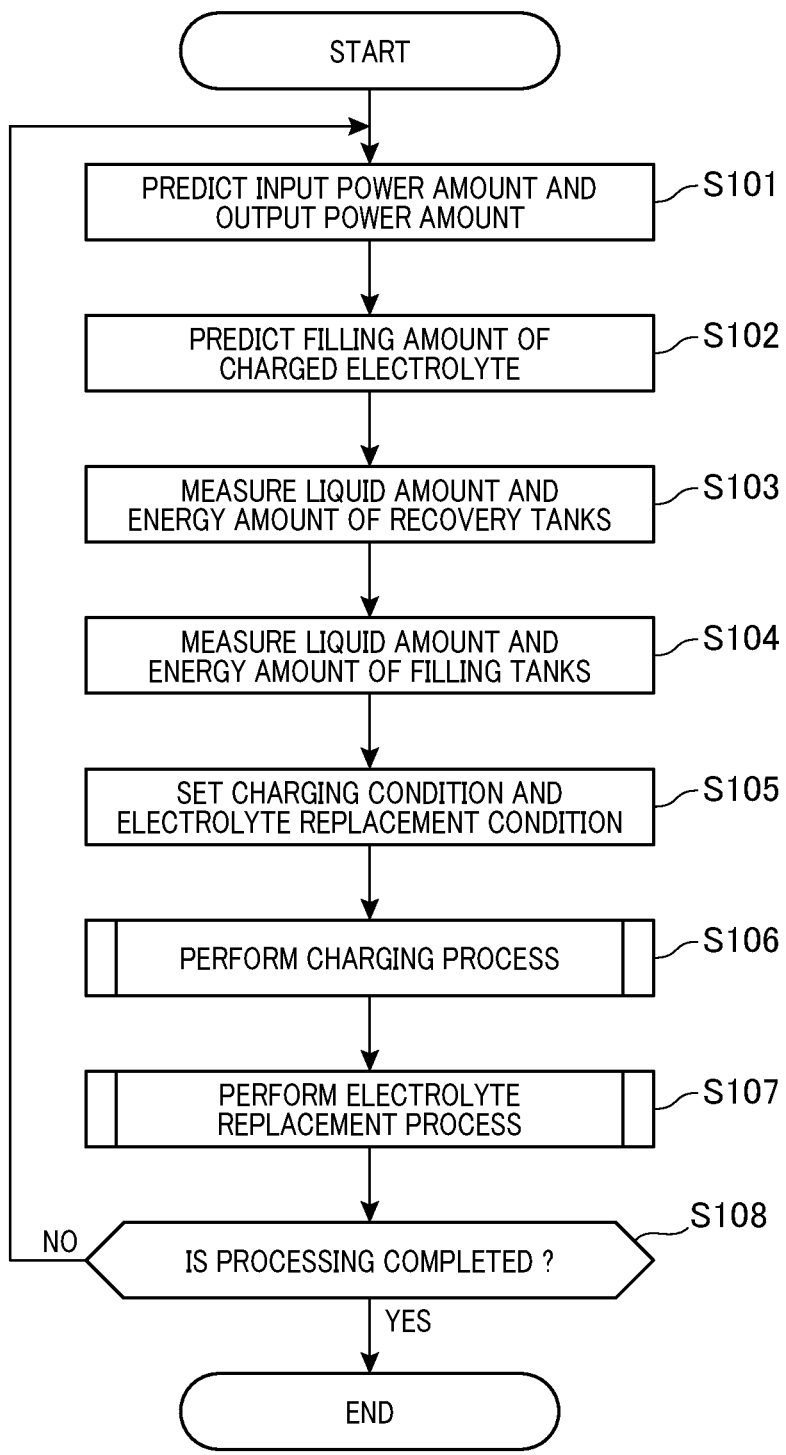
FIG. 3 is a flowchart of a control process in the electrolyte station according to the first embodiment.

As shown in FIG. 3, the flow of control includes processes at step S101 to step S108.

Here, one or a plurality of steps may be added to the foregoing steps as required. Alternatively, a plurality of steps may be integrated. In addition, the order in which the steps are performed may be changed as required.

At step S101, the input power amount Pa and the output power amount Pb are predicted based on information such as electric power unit price. The input power amount Pa is the amount of electric power that is inputted from the system power supply 152 to the charger-discharger 151. The output power amount Pb is the amount of electric power that is outputted from the charger-discharger 151 to the system power supply 152. This step S101 is performed by the power amount predicting unit 210 of the management apparatus 200.

At step S102, the filling amount Pc of the charged electrolytes Ma and Mb is predicted based on information such as a number of vehicles received by the electrolyte station 100 during a fixed period. The filling amount Pc is the amount of charged electrolytes Ma and Mb that fills the electrolyte tank 1-12 of the redox flow battery 1-11 from the filling tanks 130A and 130B. This step S102 is performed by the filling amount predicting unit 220 of the management apparatus 200. At step S103, the liquid amount Qa and the energy amount Ea of the used electrolytes La and Lb stored in the recovery tanks 120A and 120B are measured based on measurement data from the sensor apparatus 121 and the like. This step S103 is performed by the measuring unit 230 of the management apparatus 200.

At step S104, the liquid amount Qb and the energy amount Eb of the used electrolytes Ma and Mb stored in the filling tanks 130A and 130B are measured based on measurement data from the sensor apparatus 131 and the like. This step S104 is performed by the measuring unit 230 of the management apparatus 200.

At step S105, a charging condition and the electrolyte replacement condition are set based on both the prediction results predicted at step S101 and step S102 and the measurement results measured at step S103 and step S104. This step S105 is performed by the condition setting unit 240 of the management apparatus 200.

At step S106, the charging process is performed based on the charging condition set at step S105. This step S106 is performed by the control unit 160 of the electrolyte station 100 and a manager.

At step S107, electrolyte replacement is performed based on the electrolyte replacement condition set at step S105. This step S107 is performed by the control unit 160 of the electrolyte station 100 and the manager.

At step S108 whether processing is completed is determined. When processing is determined to not be completed (No at step S108), the electrolyte station 100 returns to step S101.

Here, FIG. 4 to FIG. 7 can be referenced regarding an aspect of the electrolyte station 100 during the charging process at step S106, described above. In addition, FIG. 8 and FIG. 9 can be referenced regarding an aspect of the electrolyte station 100 during the electrolyte replacement process at step S107, described above.

Here, in FIG. 4 to FIG. 9, regarding open/closed states of the on-off valves 142b, 143b, 144b, and 145b, an open state is indicated by an outlined (white) symbol and a closed state is indicated by a filled-in (black) symbol.

(Charging Process)

Figure 4:
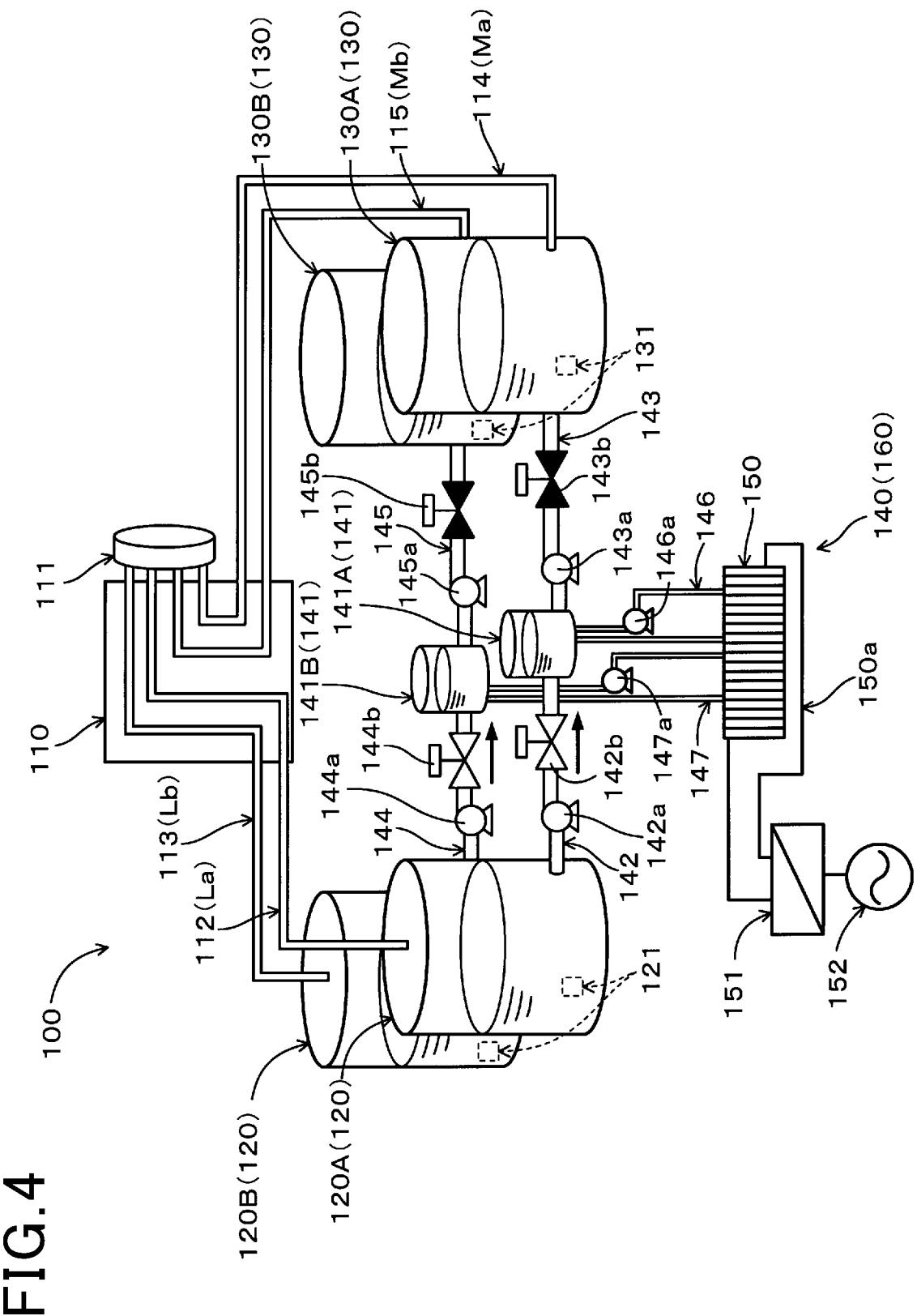
FIG. 4 is a diagram of a state of the electrolyte station according the first embodiment in a first stage of a charging process in FIG. 3.

As shown in FIG. 4, in a first stage of the charging process, the used electrolyte La is transferred from the recovery tank 120A to the charging tank 141A through use of the connection pipe 142. The used electrolyte Lb is transferred from the recovery tank 120B to the charging tank 141B through use of the connecting pipe 144. At this time, the transfer pumps 142a and 144a are operated, and the on-off valves 142b and 144b are controlled to the open state.

In addition, the transfer pumps 143*a* and 145*a*, and the circulation pumps 146*a* and 147*a* are stopped. The on-off valves 143*b* and 145*b* are controlled to the closed state. As a result, preparation for charging the used electrolytes La and Lb in the charging tanks 141A and 141B is made.

Figure 5:
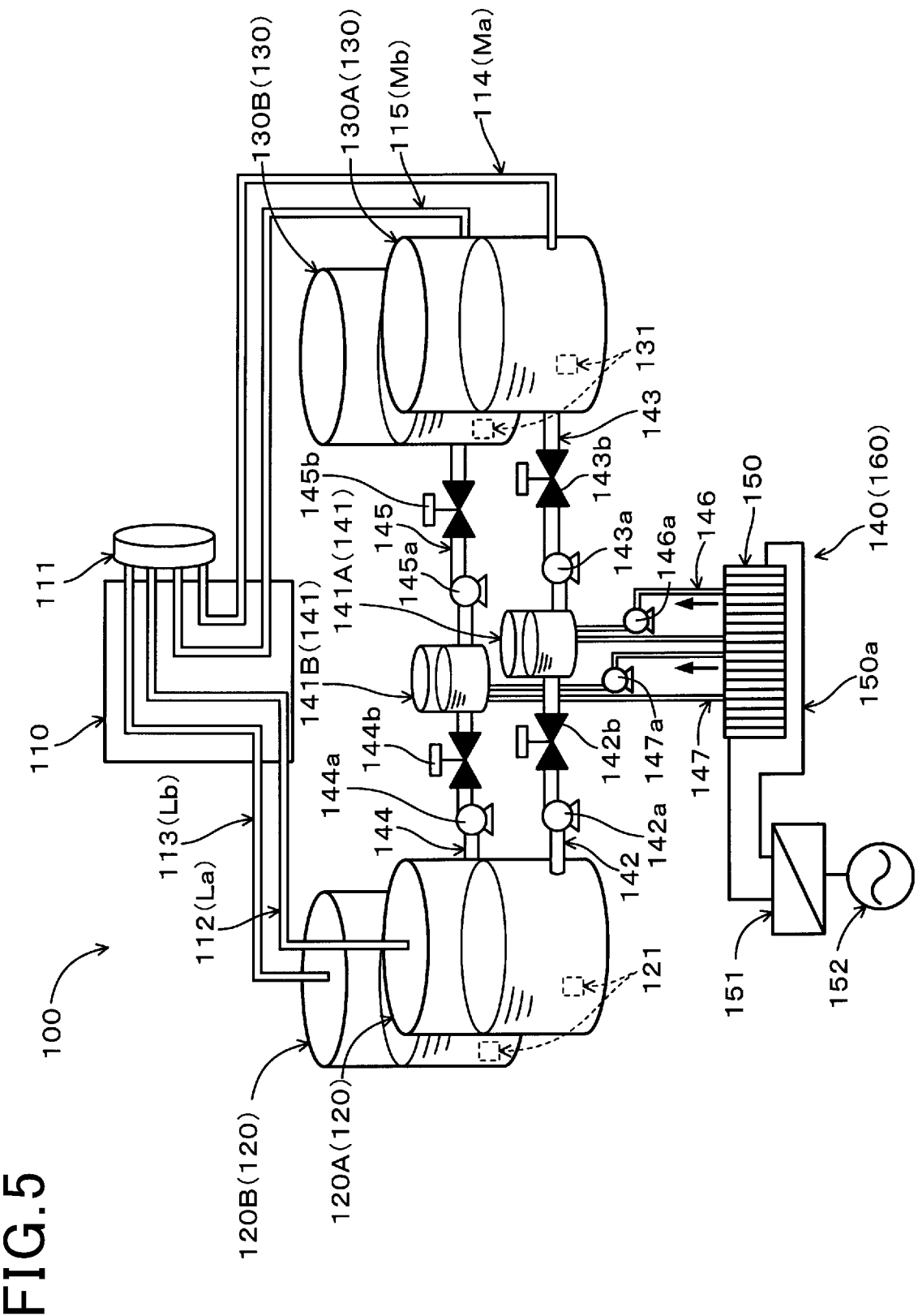
FIG. 5 is a diagram of a state of the electrolyte station according the first embodiment in a second stage of the charging process in FIG. 3.

As shown in FIG. 5, in a second stage of the charging process, the transfer pumps 142*a* and 144*a* are stopped, and the on-off valves 142*b* and 144*b* are controlled to the closed state. In addition, circulation of the used electrolytes La and Lb is established in the circulation paths 146 and 147 through operation of the circulation pumps 146*a* and 147*a*. Furthermore, the electric power of the cell stack 150 is supplied from the system power supply 152, through the charger-discharger 151 and the energization path 150*a*. As a result, charging of the electrolyte in the charging tanks 141A and 141B is started. The electric charge level of the electrolyte gradually increases with time.

Subsequently, when the electric charge level of the electrolyte is confirmed to have reached an electric charge level of the charged electrolytes Ma and Mb by a sensor apparatus (not shown), the supply of electric power from the system power supply 152 is stopped. As a result, charging of the electrolyte in the charging tanks 141A and 141B is completed.

Figure 6:
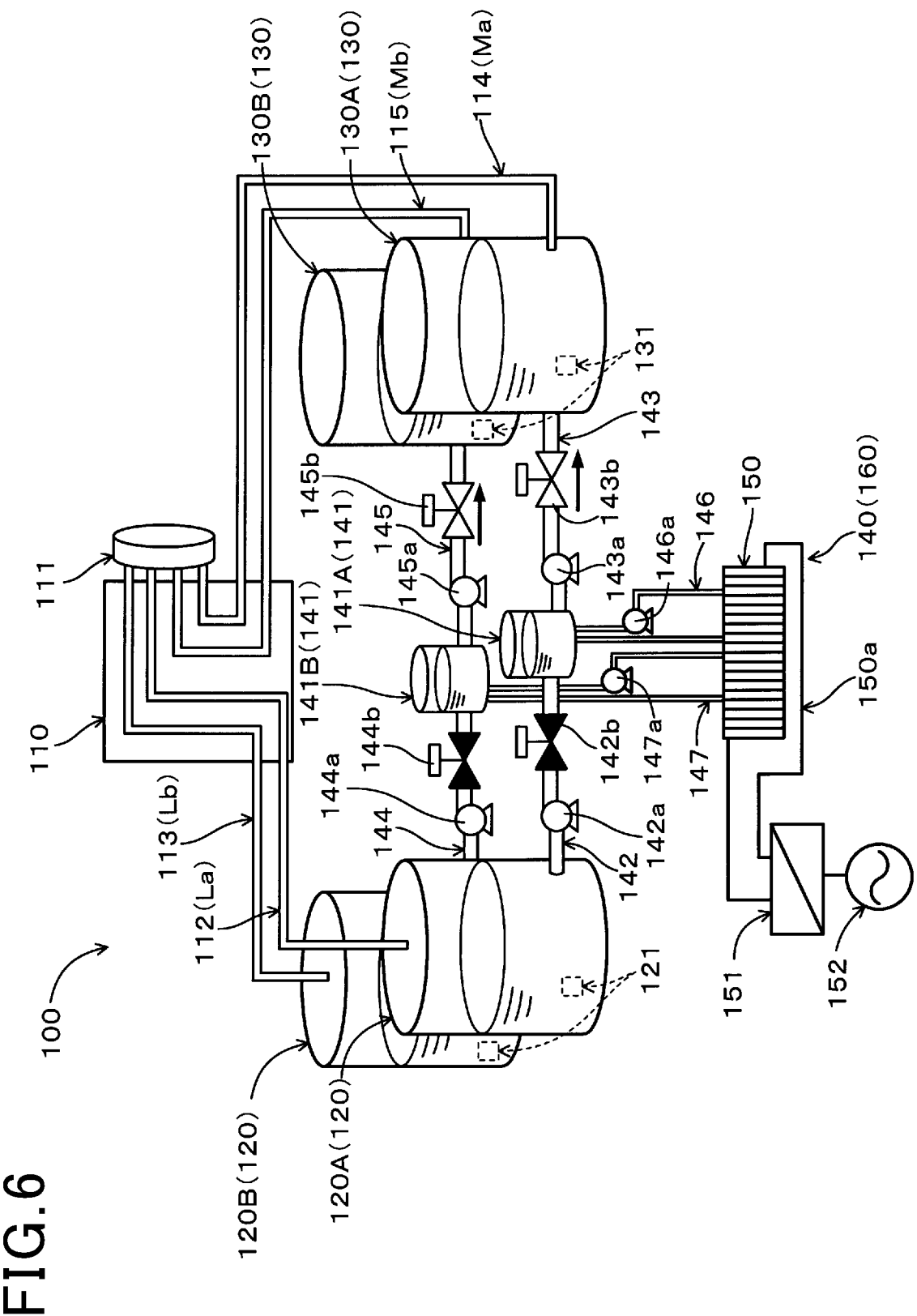
FIG. 6 is a diagram of a state of the electrolyte station according the first embodiment in a third stage of the charging process in FIG. 3.

As shown in FIG. 6, in a third stage of the charging process, the electrolyte is transferred from the charging tank 141A to the filling tank 130A through use of the connection pipe 143. The electrolyte is transferred from the charging tank 141B to the filling tank 130B through use of the connection pipe 145. At this time, the transfer pumps 143*a* and 145*a* are operated, and the on-off valves 143*b* and 145*b* are controlled to the open state. In addition, the transfer pumps 142*a* and 144*a*, and the circulation pumps 146*a* and 147*a* are stopped. The on-off valves 142*b* and 144*b* are controlled to the closed state.

Figure 7:
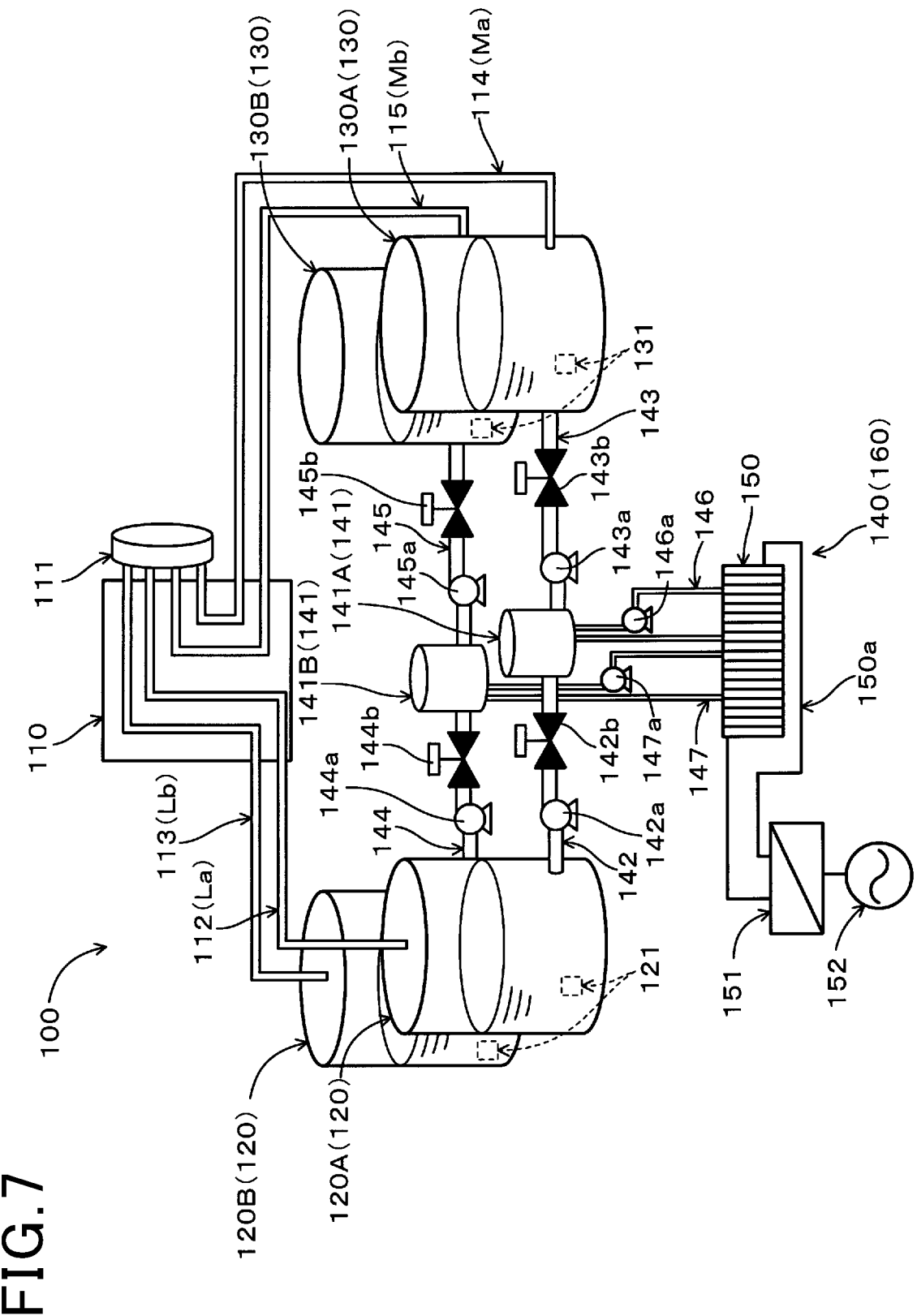
FIG. 7 is a diagram of a state of the electrolyte station according to the first embodiment.

As shown in FIG. 7, the transfer pumps 143*a* and 145*a* are subsequently stopped, and the on-off valves 143*b* and 145*b* are controlled to the closed state.

(Electrolyte Replacement Process)

Figure 8:
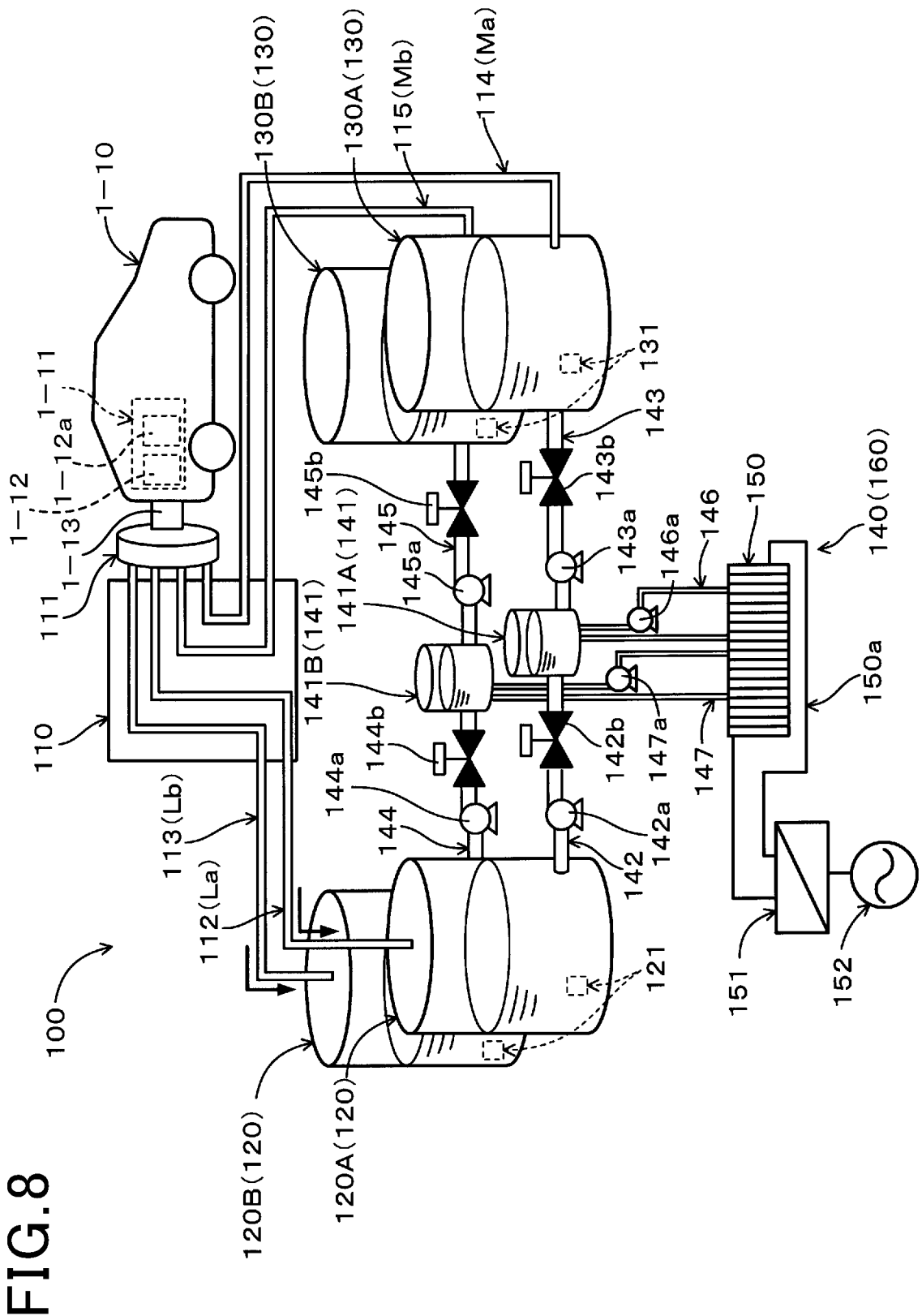
FIG. 8 is a diagram of a state of the electrolyte station according the first embodiment in a first stage of an electrolyte replacement process in FIG. 3.

As shown in FIG. 8, in the electrolyte station 100, the manager establishes a connection state in which the connector 111 of the stand 110 is connected to the connection socket 1-13 of the vehicle 1-10.

In a first stage of the electrolyte replacement process, the recovery pump (not shown) of the stand 110 is started. As a result, the used electrolytes La and Lb that fill the electrolyte tank 1-12 of the redox flow battery 1-11 in the vehicle 1-10 are drawn and recovered to the recovery tanks 120A and 120B through the recovery lines 112 and 113.

Figure 9:
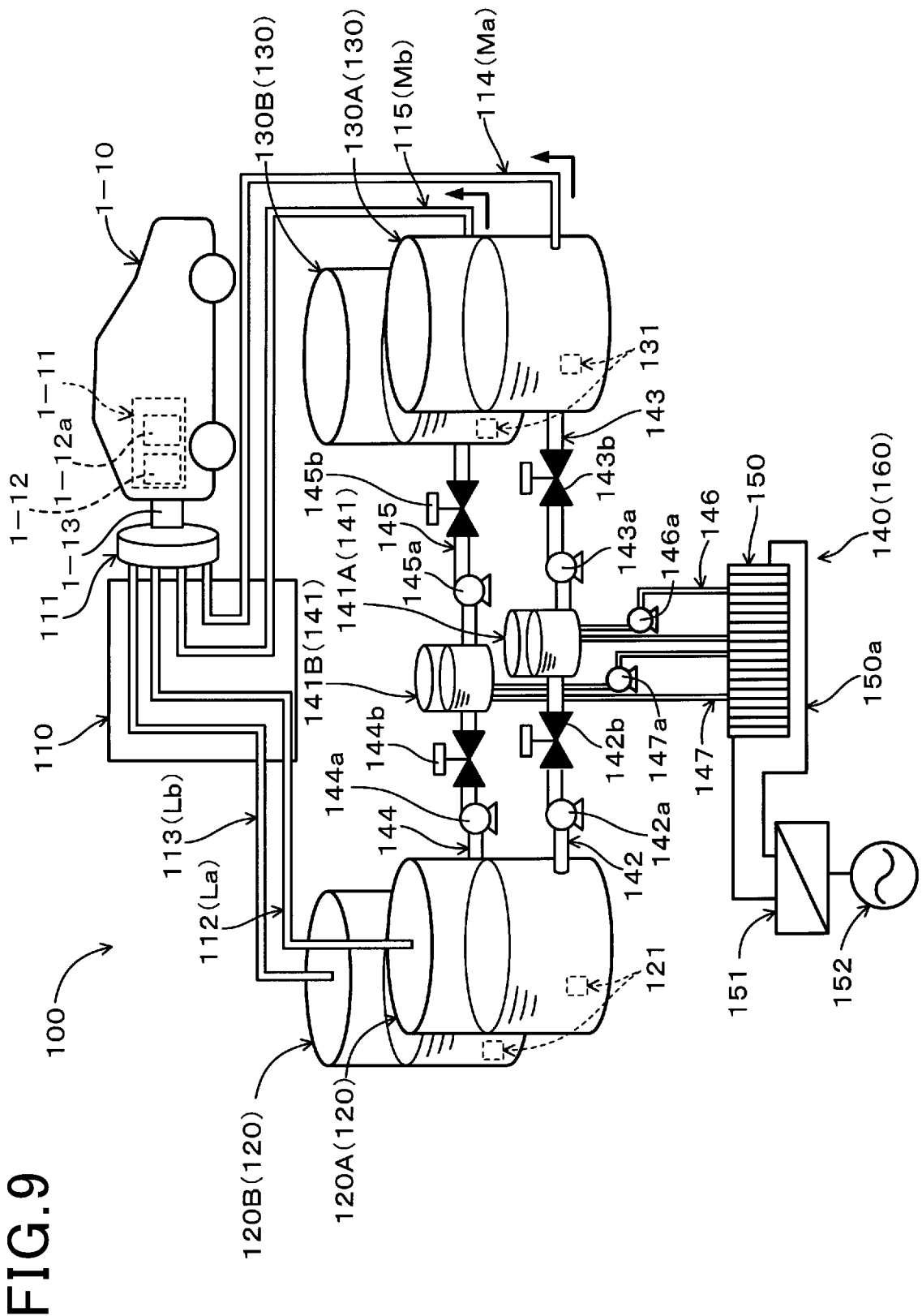
FIG. 9 is a diagram of a state of the electrolyte station according the first embodiment in a second stage of the electrolyte replacement process in FIG. 3.

As shown in FIG. 9, in a second stage of the electrolyte replacement process, the filling pump of the stand 110 is started. As a result, the charged electrolytes Ma and Mb that fill the filling tanks 130A and 130B are drawn through the filling lines 114 and 115 and fill the electrolyte tank 1-12 of the redox flow battery 1-11 in the vehicle 1-10.

According to the above-described first embodiment, working effects such as those below are achieved.

In the electrolyte station 100, the used electrolytes La and Lb that are drawn from the electrolyte tank 1-12 can be recovered to the recovery tanks 120A and 120B through the recovery lines 112 and 113, in a state in which the connector 111 of the stand 110 has connected to the connection socket 1-13, by the user. In addition, the charged electrolytes Ma and Mb that are stored in the filling tanks 130A and 130B can fill the electrolyte tank 1-12 through the filling lines 114 and 115. In this case, the operation to replace the electrolyte in the electrolyte tank 1-12 of the redox flow battery 1-11 becomes a simple operation that mainly involves an operation to connect the connector 111 of the stand 110 to the connection socket 1-13.

Consequently, electrolyte replacement in the electrolyte tank 1-12 of the redox flow battery 1-11 that is mounted to the vehicle 1-10 can be facilitated.

In the above-described electrolyte station 100, the used electrolytes La and Lb that are recovered to the recovery tanks 120A and 120B are subjected to the charging process by the charging processing apparatus 140. The used electrolytes La and Lb are then stored in the filling tanks 130A and 130B as the charged electrolytes Ma and Mb. Therefore, the used electrolytes La and Lb that are recovered from the redox flow battery 1-11 of the vehicle 1-10 can be subjected to the charging process and then used in the redox flow battery 1-11 of this vehicle 1-10 or another vehicle 1-10.

In the above-described electrolyte station 100, the charging tanks 141A and 141B that are connected between the recovery tanks 120A and 120B and the filling tanks 130A and 130B by the connection pipes 142, 143, 144, and 145 are provided. As a result, the charging tanks 141A and 141B can be used as buffer tanks for the electrolyte that has undergone the charging process.

In the above-described electric power management system 1-1, the management apparatus 200 is provided separately from the electrolyte station 100. The management apparatus 200 is capable of optimizing the operation of the electrolyte station 100 based on information such as the liquid amount of the electrolyte that is stored in each of the recovery tanks 120A and 120B and the filling tanks 130A and 130B, predicted subsequent recovery amount and filling amount, and predicted input and output of electric power in the charging processing apparatus 140.

Hereafter, other embodiments related to the above-described first embodiment will be described with reference to the drawings. According to the other embodiments, elements that are identical to those according to the above-described first embodiment are given the same reference numbers. Descriptions of identical elements are omitted.

Second Embodiment

Figure 10:
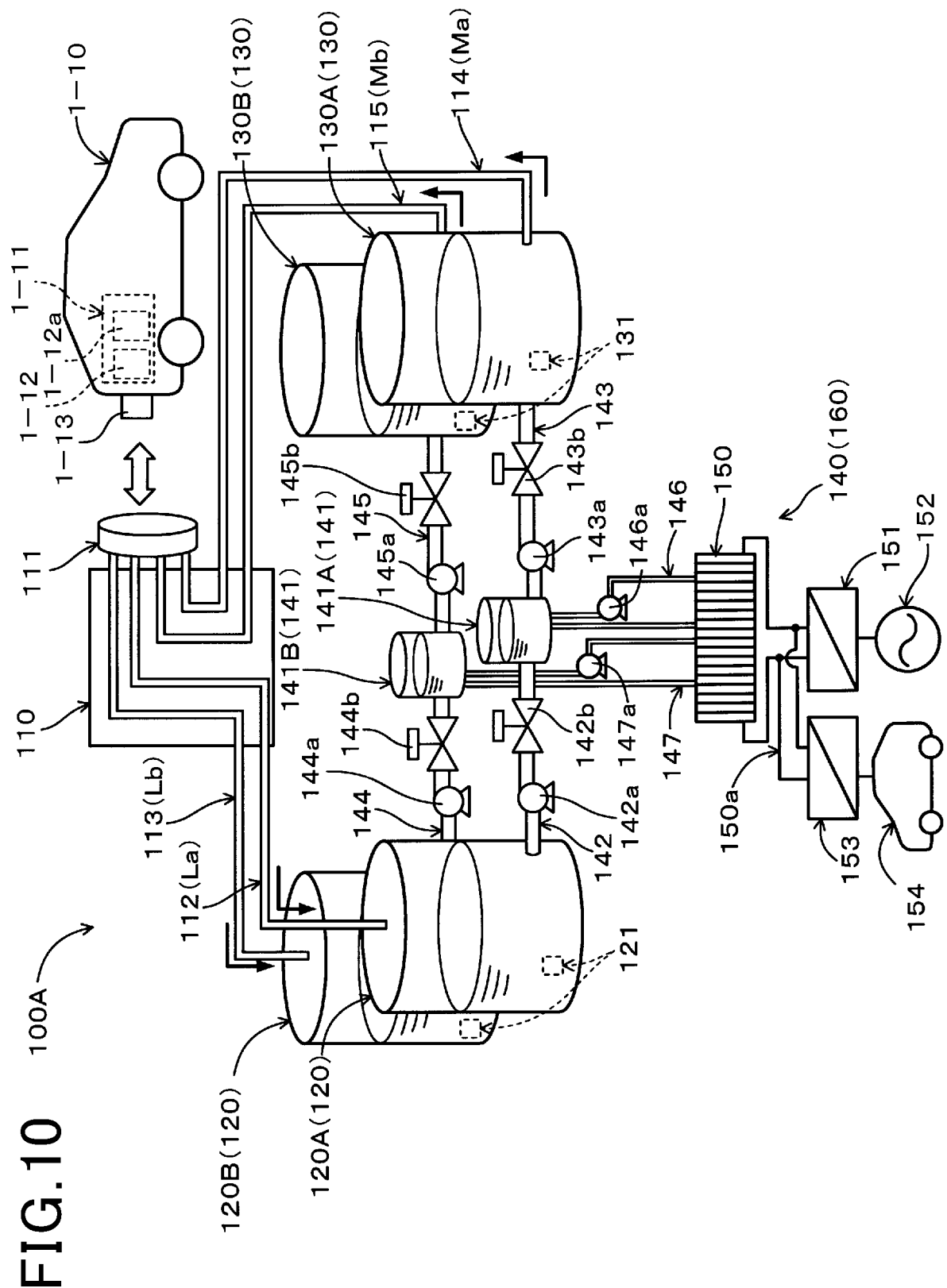
FIG. 10 is a diagram of an overall configuration of the electrolyte station according to a second embodiment.

As shown in FIG. 10, an electrolyte station 100A according to a second embodiment differs from the electrolyte station 100 according to the first embodiment in terms of a charging/discharge structure that is connected to the cell stack 150. The electrolyte station 100A is configured as a combination charging and electrolyte station that provides a function for charging a secondary battery that is mounted in a connected vehicle 154, in addition to the functions of the electrolyte station 100.

Therefore, the charging processing apparatus 140 of the electrolyte station 100A includes a charger-discharger 153, in addition to the charger-discharger 151. The charger-discharger 153 is configured as a charger-discharger for a vehicle. The charger-discharger 153 is used to perform charging and discharge with the connected vehicle 154 that is an external connection subject. The charger-discharger 153 includes a direct current-to-direct current (DC-DC) converter. The two chargers/dischargers 151 and 153 are connected in parallel to the cell stack 150.

Here, in addition to the system power supply 152 and the connected vehicle 154, other external connection subject may be provided.

The charging processing apparatus 140 of the electrolyte station 100A is controlled based on a command (referred to, hereafter, as a demand response [DR] command) that is issued based on a DR and transmitted from the management apparatus 200 (see FIG. 1).

The "demand response (DR)" herein refers to a scheme in which a stable supply of electric power is achieved through promotion of suppressed use of electric power and suppression of power consumption during peak periods, through methods such as "setting of electric power rates based on time periods" and "compensation given to consumers who avoid use during peak periods."

Other configurations are similar to those according to the first embodiment.

An aspect of the electrolyte station 100A during the charging process is similar to that shown in FIG. 4 to FIG. 7 according to the first embodiment. In addition, an aspect of the electrolyte station 100A during the electrolyte replacement process is similar to that shown in FIG. 8 and FIG. 9 according to the first embodiment.

Figure 11:
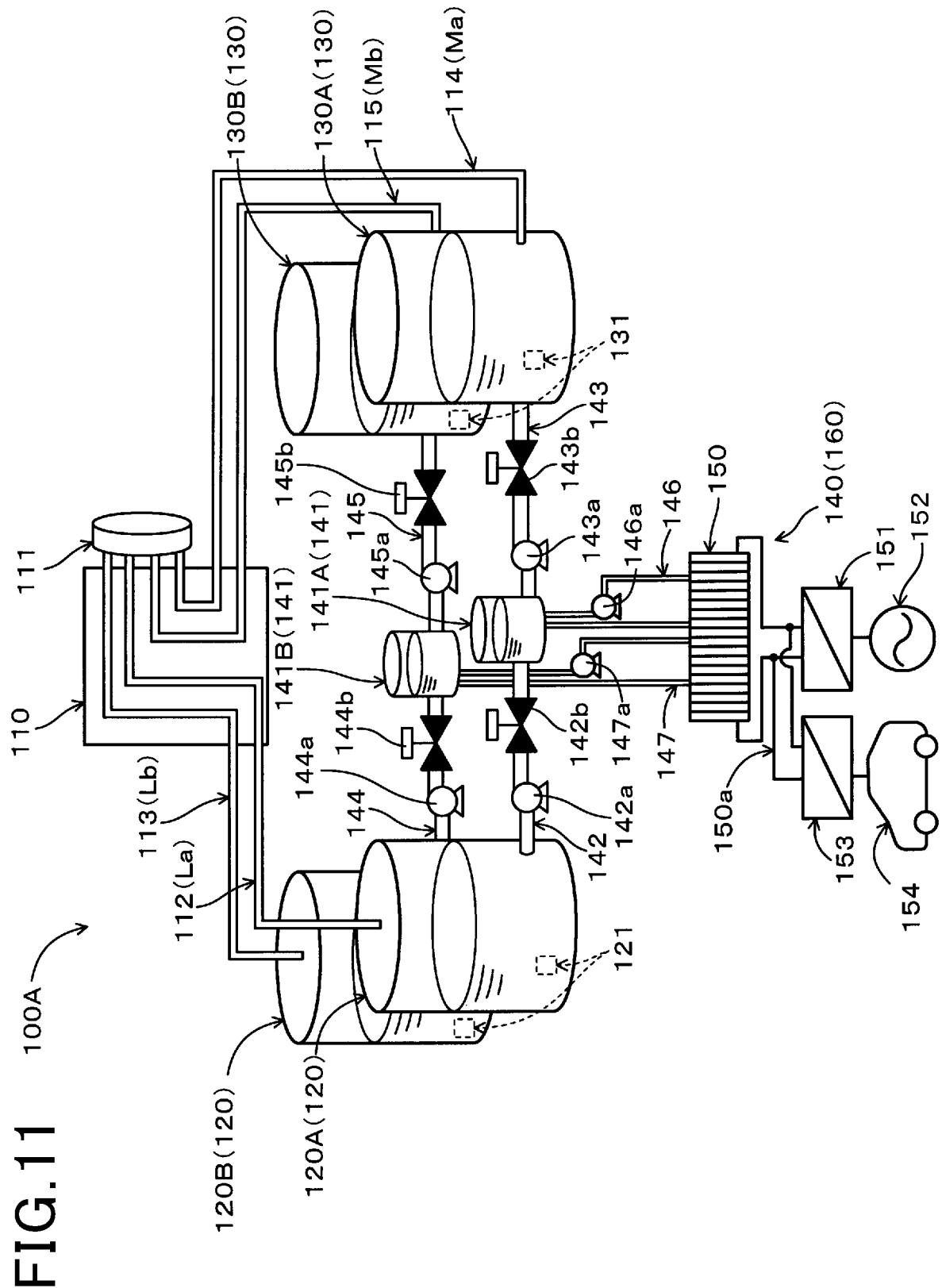
FIG. 11 is a diagram of a state of the electrolyte station according to the second embodiment.

Meanwhile, when the electrolyte station 100A is in a state such as that shown in FIG. 11, the charging processing apparatus 140 of the electrolyte station 100A is controlled based on the DR command received from the management apparatus 200.

Here, the DR command includes a first DR command and a second DR command. The first DR command is for a power absorption process in a first usage mode, described below. The second DR command is for a power discharge process in a second usage mode, described below.

(First Usage Mode)

Figure 12:
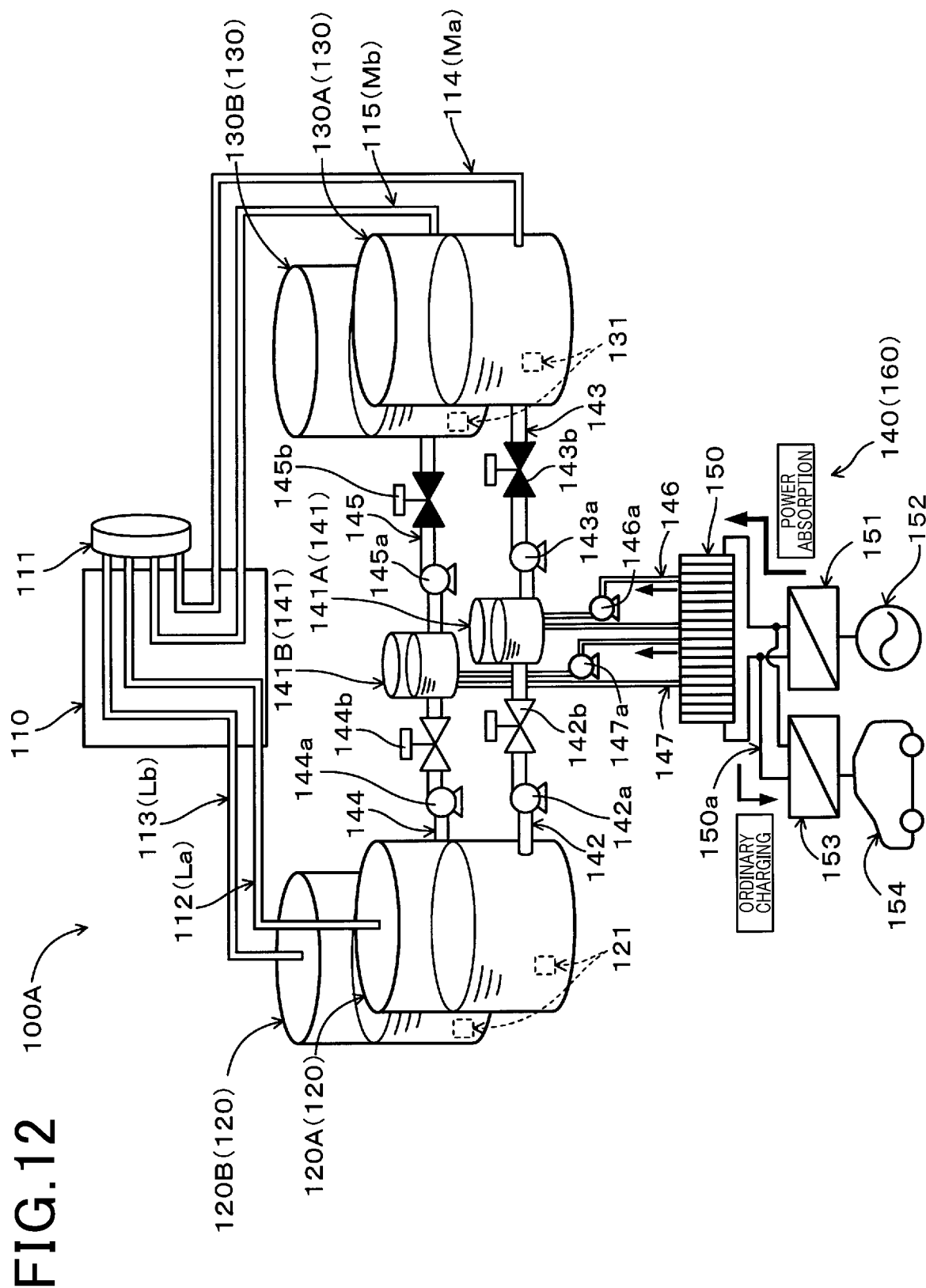
FIG. 12 is a diagram of a state of the electrolyte station according to the second embodiment in a first usage mode.

When the electrolyte station 100A receives the first DR command from the management apparatus 200, as shown in FIG. 12, the on-off valve 142b and the on-off valve 144b are opened. As a result, the recovery tank 120A and the charging tank 141A are communicated. In addition, the recovery tank 120B and the charging tank 141B are communicated. That is, in the first usage mode, the charging tanks 141A and 141B are connected to the recovery tanks 120A and 120B. The recovery tanks 120A and 120B are low-concentration-side tanks of which the electric charge is relatively low. In addition, the electrolyte is circulated between the charging tanks 141A and 141B and the cell stack 150 by the circulation pumps 146a and 147a.

In the first usage mode, the electrolyte of the charging tanks 141A and 141B and the electrolyte of the recovery tanks 120A and 120B are mixed. Absorption of electric power that is inputted through the system power supply 152 and the cell stack 150 is started in the mixed low-concentration electrolyte. In addition, in the first usage mode, a portion of the electric power that is inputted from the system power supply 152 is also used for ordinary charging of the secondary battery in the connected vehicle 154.

Subsequently, the sensor apparatus 121 determines that the first usage mode is completed under a condition that the energy amount Ea of the electrolyte has reached a predetermined level. The on-off valve 142b and the on-off valve 144b are closed. As a result, the electrolyte station 100A returns to a state such as that shown in FIG. 11.

(Second Usage Mode)

Figure 13:
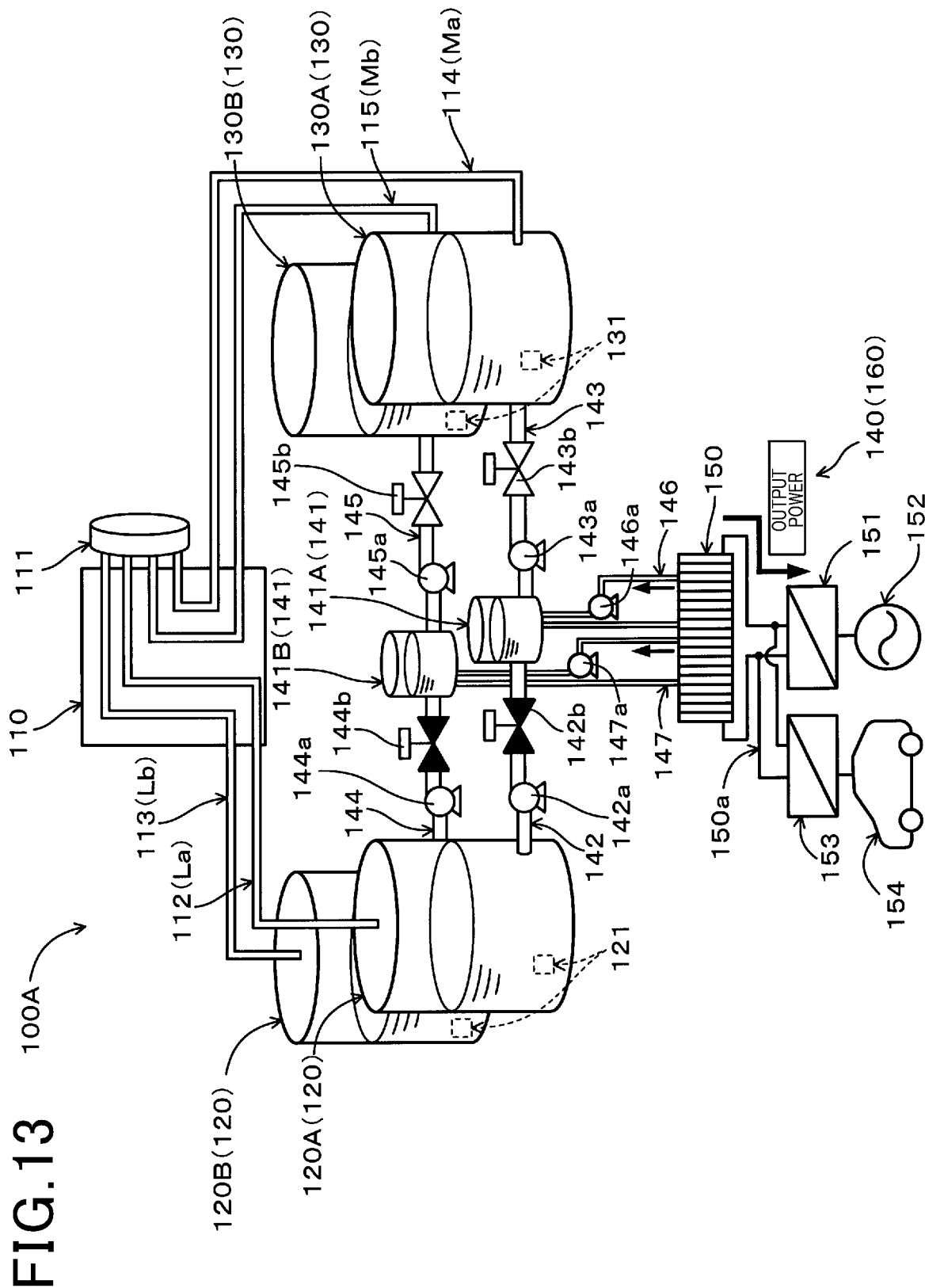
FIG. 13 is a diagram of a state of the electrolyte station according to the second embodiment in a second usage mode.

When the electrolyte station 100A receives the second DR command from the management apparatus 200, as shown in FIG. 13, the on-off valve 143b and the on-off valve 145b are opened. As a result, the filling tank 130A and the charging tank 141A are communicated. In addition, the filling tank 130B and the charging tank 141B are communicated. That is, in the second usage mode, the charging tanks 141A and 141B are connected to the filling tanks 130A and 130B. The filling tanks 130A and 130B are high-concentration-side tanks of which the electric charge level is relatively high. In addition, the electrolyte is circulated between the charging tanks 141A and 141B and the cell stack 150 by the circulation pumps 146a and 147a.

In the second usage mode, the electrolyte of the charging tanks 141A and 141B and the electrolyte of the filling tanks 130A and 130B are mixed. Electric power is outputted through the cell stacks 150 and the system power supply 152 from the mixed high-concentration electrolyte.

Subsequently, the sensor apparatus 131 determines that the second usage mode has ended under a condition that the energy amount Eb of the electrolyte has reached a predetermined level. The usage mode is switched from the second usage mode to a return mode for returning the electrolyte station 100A to the state shown in FIG. 11.

In the return mode, a first process to transfer a portion of the electrolyte in the filling tanks 130A and 130B to the recovery tanks 120A and 120B is performed. Subsequently, a second process to increase the electric charge level of the electrolyte stored in the filling tanks 130A and 130B is performed.

Figure 14:
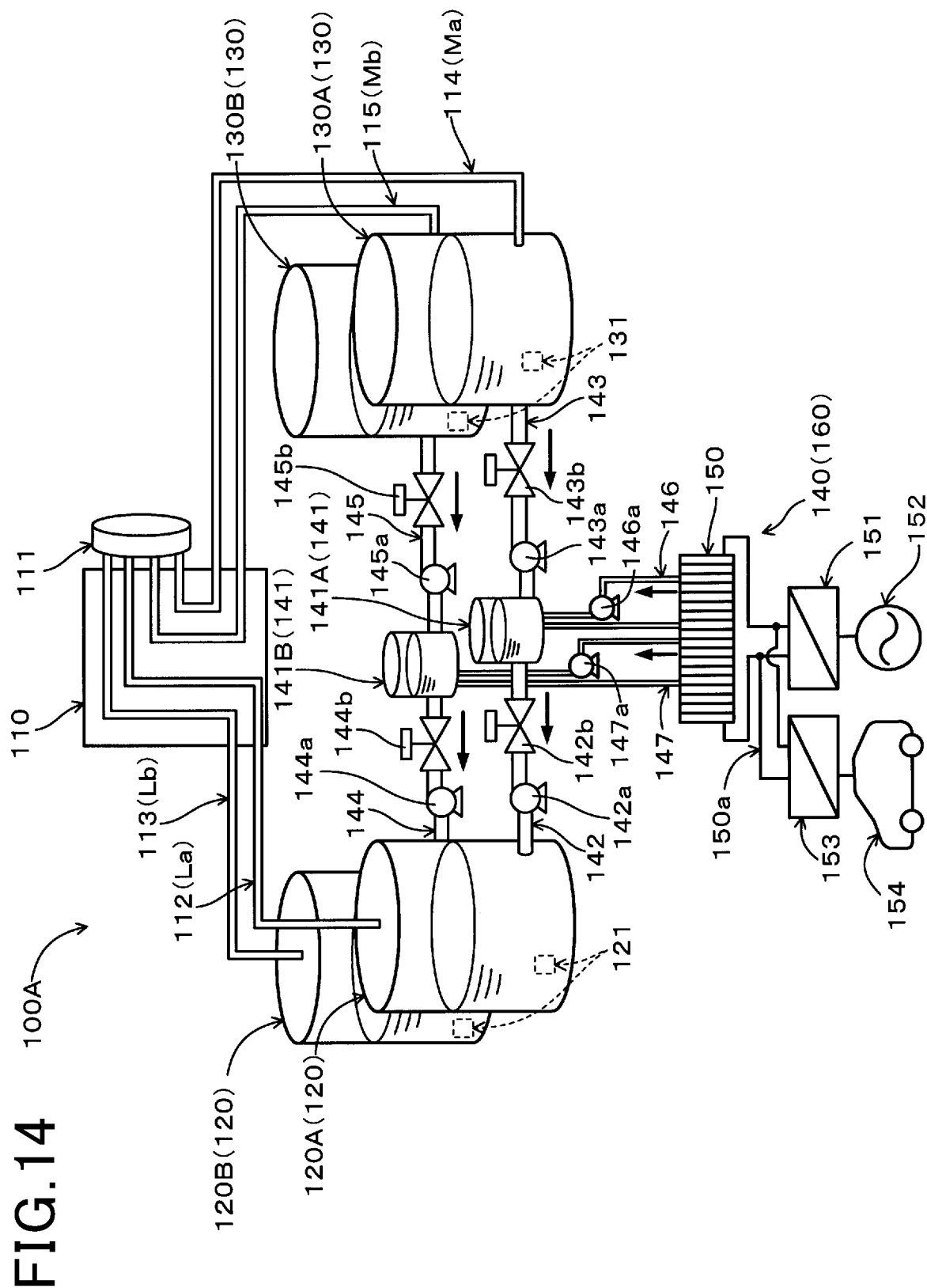
FIG. 14 is a diagram of a state of the electrolyte station according to the second embodiment during a first process in a return mode.

For the above-described first process, as shown in FIG. 14, the on-off valve 142b and the on-off valve 144b are opened. Thus, the charging tanks 141A and 141B are communicated with both the recovery tank 120A and the filling tanks 130A and 130B. Then, the transfer pumps 142a, 143a, 144a, and 145a are operated. As a result, a portion of the electrolyte in the filling tanks 130A and 130B can be transferred to the recovery tanks 120A and 120B through the charging tanks 141A and 141B.

Figure 15:
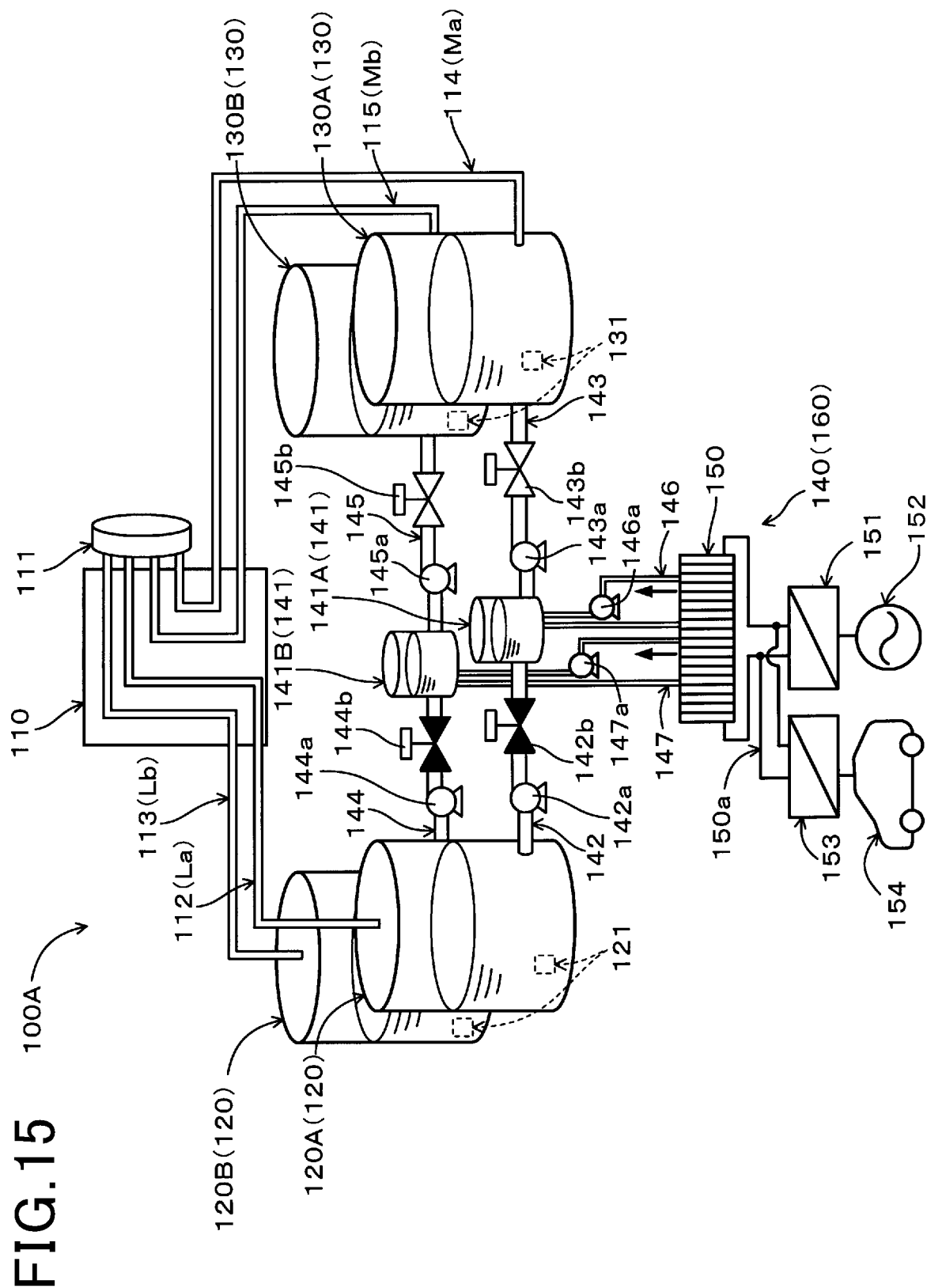
FIG. 15 is a diagram of a state of the electrolyte station according to the second embodiment during a second process in the return mode.

For the above-described second process, as shown in FIG. 15, the on-off valve 142b and the on-off valve 144b are closed. As a result, charging of the electrolyte in the charging tanks 141A and 141B is started, and the electric charge level of the electrolyte gradually increases with time.

When the electric charge level of the electrolyte is confirmed to have reached the electric charge level of the charged electrolytes Ma and Mb, the electrolyte is transferred from the charging tanks 141A and 141B to the filling tanks 130A and 130B. Subsequently, the on-off valve 143b and the on-off valve 145b are closed. As a result, the electrolyte station 100A is returned to a state such as that shown in FIG. 11.

(Third Usage Mode)

Figure 16:
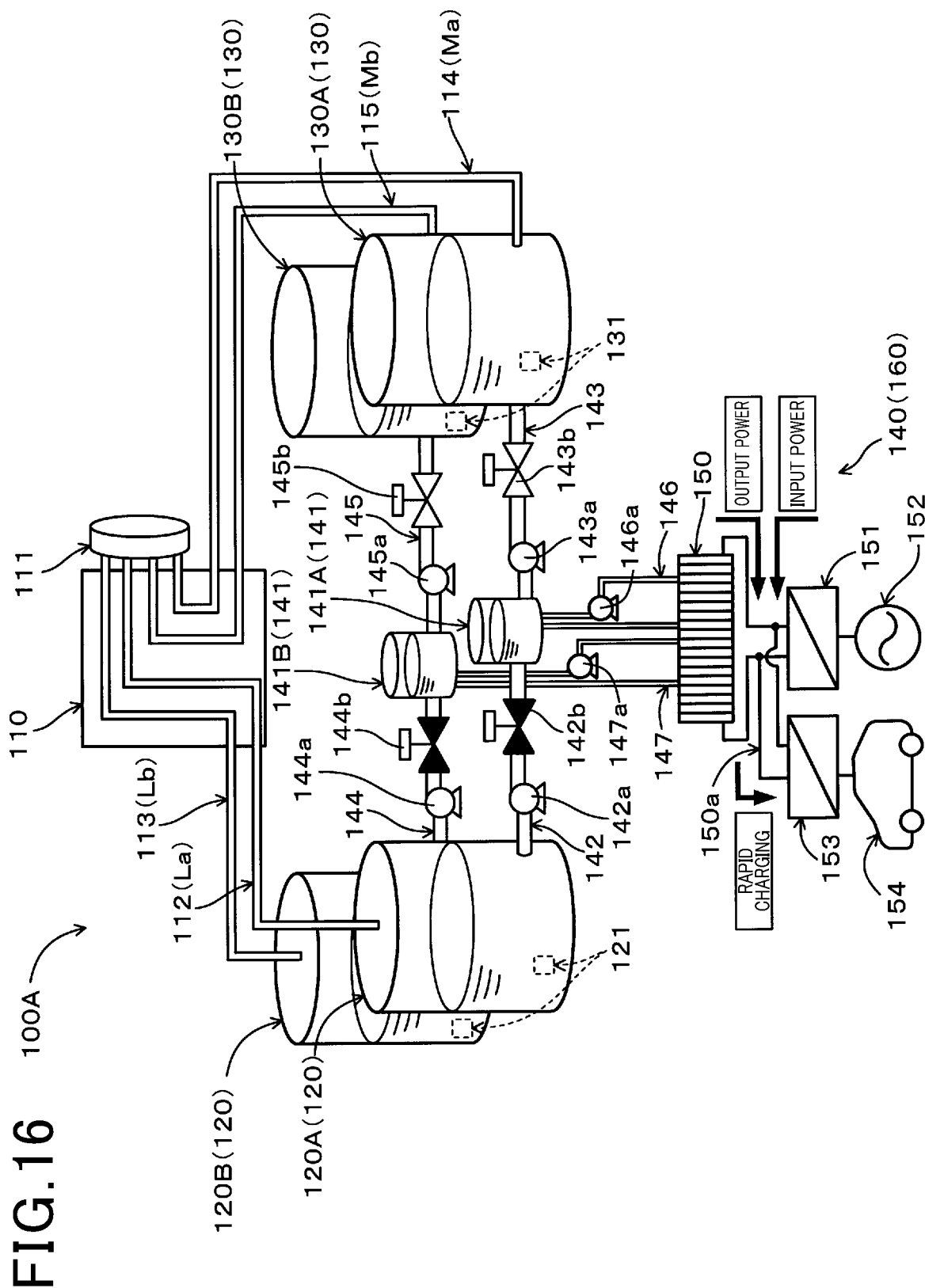
FIG. 16 is a diagram of a state of the electrolyte station according to the second embodiment in a third usage mode.

In the electrolyte station 100A, a third usage mode is performed when rapid charging of the connected vehicle 154 or suppression of discharge to the system power supply 152 is required. As shown in FIG. 16, in the third usage mode, the on-off valve 143b and the on-off valve 145b are opened in a manner similar to that in the second usage mode. As a result, the charging tanks 141A and 141B are connected to the filling tanks 130A and 130B that are the high-concentration-side tanks of which the electric charge level is relatively high. In addition, the electrolyte is circulated between the charging tanks 141A and 141B and the cell stack 150 by the circulation pumps 146a and 147a.

In the third usage mode, the electrolyte of the charging tanks 141A and 141B and the electrolyte of the filling tanks 130A and 130B are mixed. Electric power is outputted to the cell stack 150 from the mixed high-concentration electrolyte. In addition, electric power is inputted from the system power supply 152. At this time, rapid charging of the connected vehicle 154 can be performed through use of both the output power from the cell stack 150 and the input power from the system power supply 152.

Upon completion of the rapid charging of the connected vehicle 154, the usage mode is switched from the third usage mode to the return mode for returning the electrolyte station 100A to the state shown in FIG. 11.

Although not particularly shown in the drawings, regarding the return mode, in a manner similar to the return mode when the second usage mode is performed, the first process (see FIG. 14) in which a portion of the electrolyte in the filling tanks 130A and 130B is transferred to the recovery tanks 120A and 120B is performed. Subsequently, the second process (see FIG. 15) in which the electric charge level of the electrolyte stored in the filling tanks 130A and 130B is increased is performed.

According to the above-described second embodiment, the electrolyte station 100A can be structured as a combination charging and electrolyte station.

Other working effects similar to those according to the first embodiment are achieved.

The present disclosure is not limited to the above-described typical embodiments. Various applications and modifications are possible without departing from the object of the present disclosure. For example, the following embodiments are possible through modification of the above-described embodiments.

According to the above-described embodiments, an example is given in which the cell stack 150 is connected to each of the recovery tanks 120A and 120B and the filling tanks 130A and 130B with the charging tanks 141A and 141B of the charging processing apparatus 140 therebetween. However, instead, the charging tanks 141A and 141B may be omitted. A structure in which the cell stack 150 is connected to each of the recovery tanks 120A and 120B and the filling tanks 130A and 130B by connection pipes can be used.

According to the above-described embodiments, an example in which the electrolyte stations 100 and 100A include the charging processing apparatus 140 is given. However, the charging processing apparatus 140 of the electrolyte stations 100 and 100A can be omitted as required. In this case, the used electrolytes La and Lb that are recovered to the recovery tanks 120A and 120B are transferred to a charging facility outside the electrolyte station 100 or 100A, and charged. Subsequently, the charged electrolytes Ma and Mb fills the filling tanks 130A and 130B.

Next, third and fourth embodiments will hereinafter be described with reference to FIG. 17 to FIG. 21. The third and fourth embodiments relate to an energy management apparatus, an energy management system, a terminal apparatus, and energy management system.

Third Embodiment

Figure 17:
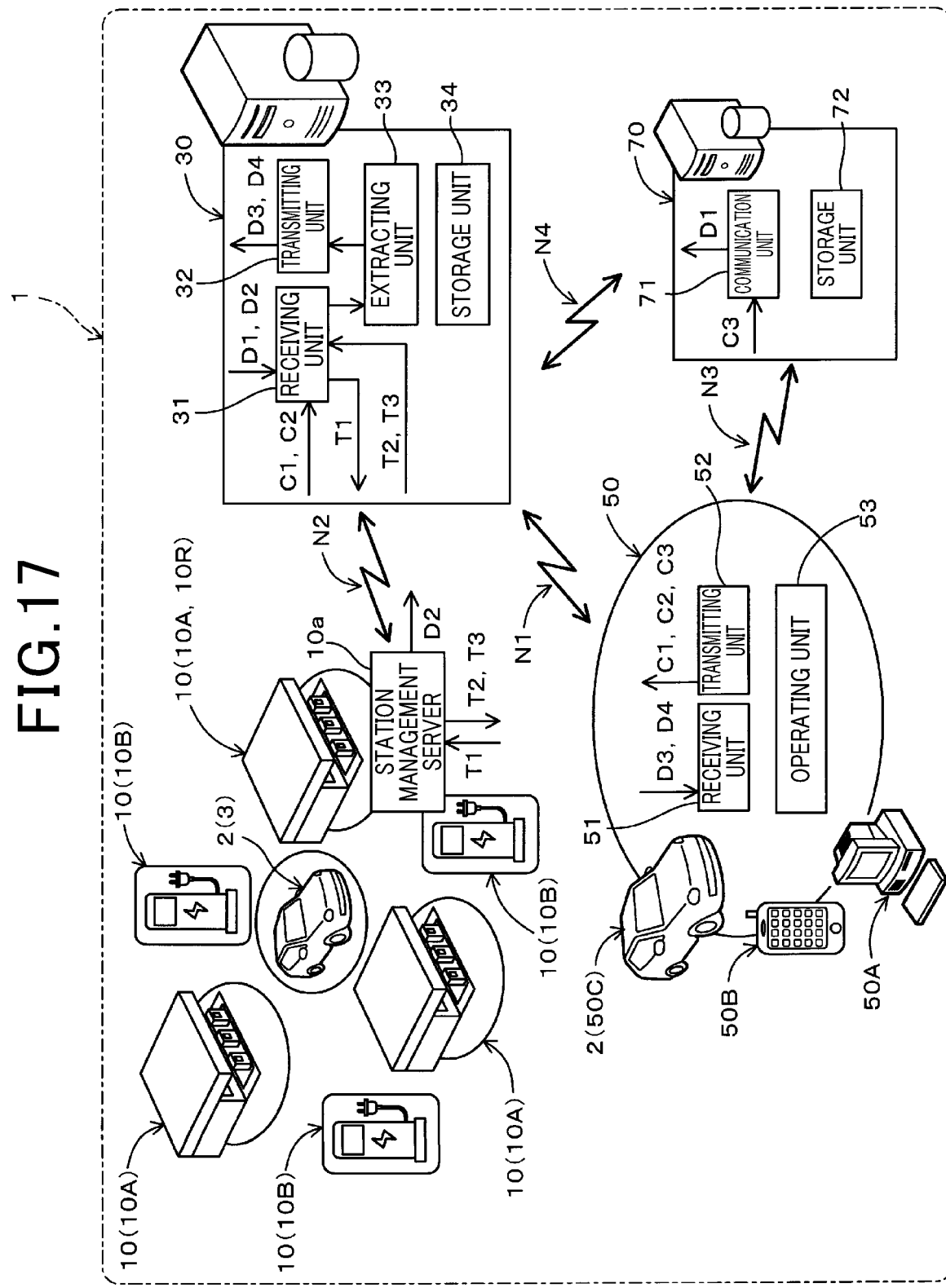
FIG. 17 is a configuration diagram of an energy management system according to a third embodiment.

As shown in FIG. 17, an energy management system 1 according to a third embodiment includes, as constituent elements, a plurality of energy supply stations 10, an energy management apparatus 30, a terminal apparatus 50, and a vehicle information server 70.

Here, in FIG. 17, one of each of the energy management apparatus 30, the terminal apparatus 50, and the vehicle information server 70 are shown for the convenience of description. However, the quantities of the above-described constituent elements can be changed as appropriate. In addition, other constituent elements may be added to the above-described constituent elements as required.

The plurality of energy supply stations 10 include a plurality of electrolyte stations 10A and a plurality of charging stations 10B.

Although described in detail hereafter, the electrolyte station 10A is an energy supply station that includes a facility that enables electrolyte replacement in a redox flow battery 3 that is mounted to an electric vehicle 2.

The charging station 10B is an energy supply station that includes a known facility that enables power supply, through a power supply connector, to a direct-current power source of which power is converted from that of an alternating-current power source.

Here, at least one electrolyte station 10A among the plurality of electrolyte stations 10A includes a facility similar to that of the charging station 10B, in addition to the facility that enables electrolyte replacement in the redox flow battery 3.

Each energy supply station 10 includes a station management server 10a that enables communication of information with a receiving unit 31 and a transmitting unit 32, via a communication line N2. The receiving unit 31 and the transmitting unit 32 serve as a communication unit of the energy management apparatus 30.

The station management server 10a can receive reception information (reception inquiry command T1, described hereafter) from the transmitting unit 32 of the management apparatus 30 via the communication line N2. In addition, the station management server 10 can transmit transmission information (reception authorization response T2 and reception not-possible response T3, described hereafter) to the receiving unit 31 of the management apparatus 30 via the communication line N2.

The energy management apparatus 30 (referred to, hereafter, as simply a "management apparatus 30") manages energy supply to the electric vehicle 2 in which the redox flow battery 3 is mounted. The management apparatus 30 includes the receiving unit 31, the transmitting unit 32, an extracting unit 33, and a storage unit 34.

Here, the "electric vehicle 2" is an electric car that travels using electric power as an energy source and an electric motor as a power source. In particular, the electric vehicle 2 is an electric car to which the redox flow battery 3 is mounted. In the description below, the electric vehicle 2 is simply referred to as a "vehicle 2" for convenience.

The redox flow battery 3 that is mounted to the vehicle 2 includes a reaction tank 4a, and a positive-terminal and negative-terminal electrolyte tank 4. The reaction tank 4a is partitioned into an anode-side electrolytic tank and a cathode-side electrolytic tank by an ion-exchange film. The electrolyte tank 4 stores an electrolyte that is supplied to the reaction tank 4a. The redox flow battery 3 is capable of discharging electric power that is generated in the redox flow battery 3. The redox flow battery 3 is also capable of charging external electric power. In the redox flow battery 3, the reaction tank 4a provides functions that are similar to those of a cell stack 28, described hereafter. The electrolyte tank 4 provides functions that are similar to those of a charging tank 21, described hereafter.

Regarding a more detailed structure of the redox flow battery 3, for example, refer to the structures of the redox flow battery disclosed in JP-A-2011-233371 and JP-A-2012-523103.

The receiving unit 31 of the management apparatus 30 receives an information request command C1 from the terminal apparatus 50 via a communication line N1. The information request command C1 is issued to request information that is effective for the user of the vehicle 2 in selecting the energy supply station 10 that is suitable for energy supply to the vehicle 2. The information request command C1 is received by the receiving unit 31.

The "user" herein widely includes not only an individual owner who owns the vehicle 2, but also a business operator that owns a plurality of vehicles 2 for purposes such as a rental business or a car-sharing business, and the like.

The extracting unit 33 of the management apparatus 30 extracts recommended station information D3 in response to reception of the information request command C1 in the receiving unit 31. The recommended station information D3 serves as presented information that can be presented to the user. The recommended station information D3 is extracted based on both vehicle information D1 that is related to the vehicle 2 and facility information D2 that is related to the plurality of energy supply stations 10.

For example, the extracting unit 33 can compare the vehicle information D1 and the facility information D2 using a known matching process. Then, as the comparison result, the extracting unit 33 can extract information regarding a single or a plurality of recommended stations 10R that are applicable to the facility information D2 of which a number of fields that match the fields of the vehicle information D1 is relatively large, as the recommended station information D3.

The vehicle information D1 is information regarding each of a plurality of vehicles 2 to which the redox flow battery 3 is mounted. The vehicle information D1 includes basic information on the vehicle 2, such as a vehicle name, a vehicle body number, and a model type. The vehicle information D1 also includes energy demand information regarding the vehicle 2, as well as information such as a current stopping position or traveling position of the vehicle 2, and a remaining energy amount of the electrolyte tank 4 in the redox flow battery 3.

As the energy demand information that is a type of vehicle information D1, for example, the following fields can be typically provided: electrolyte type; stored electrolyte amount [L]; current value of stored power amount [kWh]; predicted value of stored power amount [kWh]; current value of receivable electrolyte amount [L]; predicted value of receivable electrolyte amount [L]; predicted value of power consumption amount [kWh]; charging capability [kW]; charging connector type; filling capability [L/min]; filling connector type, desired selection between solution replacement and charging; desired power selling price [yen]; and desired primary energy source ratio [%].

The facility information D2 is information on the facilities of each of the plurality of energy supply stations 10. The facility information D2 includes basic information on the energy supply station 10, such as location. The facility information D2 also includes energy supply information regarding the energy supply station 10, operation information such as a waiting state of the vehicle 2 at the energy supply station 10, and the like.

As the energy supply information that is a type of facility information D2, for example, the following fields can be typically provided: stored electrolyte amount [L], current value of stored power amount [kWh], predicted value of stored power amount [kWh], current value of receivable electrolyte amount [L], predicted value of receivable electrolyte amount [L], predicted value of power consumption amount [kWh], power supply capability [kW], and filling capability [L/min].

The recommended station information D3 that serves as the presented information is information that is related to a single or a plurality of recommended stations 10R that are recommended for the vehicle 2, among the plurality of energy supply stations 10. As the recommended station information D3, fields such as address, contact information, and list of facilities can be typically provided.

Here, regarding the recommended station information D3, the number of recommended stations 10R may be one or a plurality of recommended stations 10R.

In addition, the presented information that is extracted by the extracting unit 33 of the management apparatus 30 is not limited to only the recommended station information D3. For example, instead of or in addition to the recommended station information D3, the extracting unit 33 may extract, as the presented information, the number of vehicles that are waiting at a predetermined energy supply station 10, an estimated amount of time required for the waiting state to be resolved, or an estimated time at which the waiting state will be resolved.

The transmitting unit 32 of the management apparatus 30 transmits the recommended station information D3 extracted by the extracting unit 33 to the terminal apparatus 50. As a result, the recommended station information D3 that is reply information in response to the information request command Cl is transmitted to the terminal apparatus 50.

The above-described receiving unit 31 periodically receives the facility information D2 from the station management server 10a that is provided in each of the plurality of energy supply stations 10, via the communication line N2.

Here, the receiving unit 31 may receive the facility information D2 from each station management server 10a in response to an information request from the management apparatus 30.

In addition, the receiving unit 31 receives a selection command C2 regarding the recommended station 10R based on the recommended station information D3, from the terminal apparatus 50, via the communication line N1. The selection command C2 is a command that indicates that the recommended station 10R has been selected by the user.

The receiving unit 31 is capable of connecting to the vehicle information server 70 that manages the vehicle information D1, via a communication line N4. When the information request command C1 is received from the terminal apparatus 50, the receiving unit 31 is connected to the communication unit 71 of the vehicle information server 70 based on a transmission command C3 that is outputted from the terminal apparatus 50 to the vehicle information server 70. The receiving unit 31 then receives the vehicle information D1 from the vehicle information server 70.

The above-described transmitting unit 32 transmits the reception inquiry command T1 regarding the vehicle 2, together with the vehicle information D1 related to the vehicle 2, to the station management server 10a of the recommended station 10R in response to the reception of the selection command C2 in the receiving unit 31.

In addition, when the receiving unit 31 receives the reception authorization response T2 regarding the vehicle 2 from the station management server 10a of the recommended station 10R, the transmitting unit 32 transmits guidance route information D4 to the terminal apparatus 50. The guidance route information D4 is information on a route to the recommended station 10R.

The storage unit 34 of the management apparatus 30 is capable of storing information therein. The storage unit 34 stores the facility information D2 that is received by the receiving unit 31 in cooperation with the station management server 10a. Alternatively, the storage unit 34 updates the facility information D2 that is already stored. At this time, the storage unit 34 stores both facility information D2a and facility information D2b as the facility information D2. The facility information D2a is information related to a plurality of electrolyte stations 10A. The facility information D2b is information related to a plurality of charging stations 10B.

The terminal apparatus 50 is used to acquire presented information regarding energy supply to the vehicle 2 to which the redox flow battery 3 is mounted. The terminal apparatus 50 may be a dedicated apparatus that only acquires the presented information. Alternatively, the terminal apparatus 50 may be a dual-purpose apparatus that, in addition to being capable of acquiring the presented information, is also capable of acquiring information other than the presented information.

The terminal apparatus 50 is connected to the management apparatus 30 so as to be capable of communicating information via the communication line Ni. In addition, the terminal apparatus 50 is connected to the vehicle information server 70 so as to be capable of communicating information via the communication line N4. The terminal apparatus 50 includes a receiving unit 51, a transmitting unit 52, and an operating unit 53.

The transmitting unit 52 of the terminal apparatus 50 transmits each of the above-described information request command C1 and selection command C2 to the receiving unit 31 of the management apparatus 30 via the communication line N1.

The receiving unit 51 of the terminal apparatus 50 receives each of the above-described recommended station information D3 and guidance route information D4 from the transmitting unit 32 of the management apparatus 30 via the communication line N1. That is, the receiving unit 51 receives the recommended station information D3 that is transmitted from the management apparatus 30 in response to the information request command C1. The receiving unit 51 also receives the guidance path information D4 that is transmitted from the management apparatus 30 in response to the selection command C2.

The operating unit 53 of the terminal apparatus 50 is configured to enable the user to perform a key input operation, a tap input operation, a voice input operation, or the like.

During a first operation for transmitting the information request command C1 in the operating unit 53, the information request command C1 is transmitted from the transmitting unit 52 to the management apparatus 30 via the communication line N1. At this time, the transmission command C3 is transmitted from the transmitting unit 52 to the vehicle information server 70 via the communication line N3. As a result, the vehicle information server 70 transmits the vehicle information D1 that is stored in the storage unit 72 to the management apparatus 30 via the communication line N4.

In addition, during a second operation for transmitting the selection command C2 in the operating unit 53, the selection command C2 is transmitted from the transmitting unit 52 to the management apparatus 30 via the communication line N1.

The above-described terminal apparatus 50 includes a stationary terminal 50A, a portable terminal 50B, an onboard apparatus 50C, and the like.

Here, the stationary terminal 50A is an apparatus that can be used by the user in an installed state. A large-sized personal computer that is not expected to be carried typically corresponds to the stationary terminal 50A.

The portable terminal 50B is a compact, light-weight mobile apparatus that can be carried and used by a user. A portable mobile phone (including smartphone), a tablet-type information terminal, and a laptop-type personal computer typically correspond to the portable terminal 50B.

The onboard apparatus 50C is mounted to the vehicle 2. An operating apparatus that includes the operating unit 53, such as dash buttons and switches, and is arranged as appropriate in an instrument panel, a console, a steering wheel, an electronic control unit (ECU), or the like of the vehicle 2, a monitoring control apparatus for monitoring the vehicle 2, and the like correspond to the onboard apparatus 50C.

When the vehicle 2 is an automatic driving vehicle or an automatic management system is mounted to the vehicle 2, the onboard apparatus 50C can automatically output the information request command C1 without the operating unit 53 being operated by the user. In this case, the operating unit 53 can be omitted.

The vehicle information server 70 includes a communication unit 71 and a storage unit 72. The communication unit 71 is capable of communicating information with the terminal apparatus 50 via the communication line N3. In addition, the communication unit 71 is capable of communicating information with the management apparatus 30 via the communication line N4. The storage unit 72 stores the vehicle information D1 related to a plurality of vehicles 2 therein. In addition, the vehicle information D1 that is already stored in the storage unit 72 is updated by the vehicle information server 70 periodically communicating with the terminal apparatus 50.

Here, the management apparatus 30 or the terminal apparatus 50 may additionally provide a part or all of the functions of the vehicle information server 70.

Figure 18:
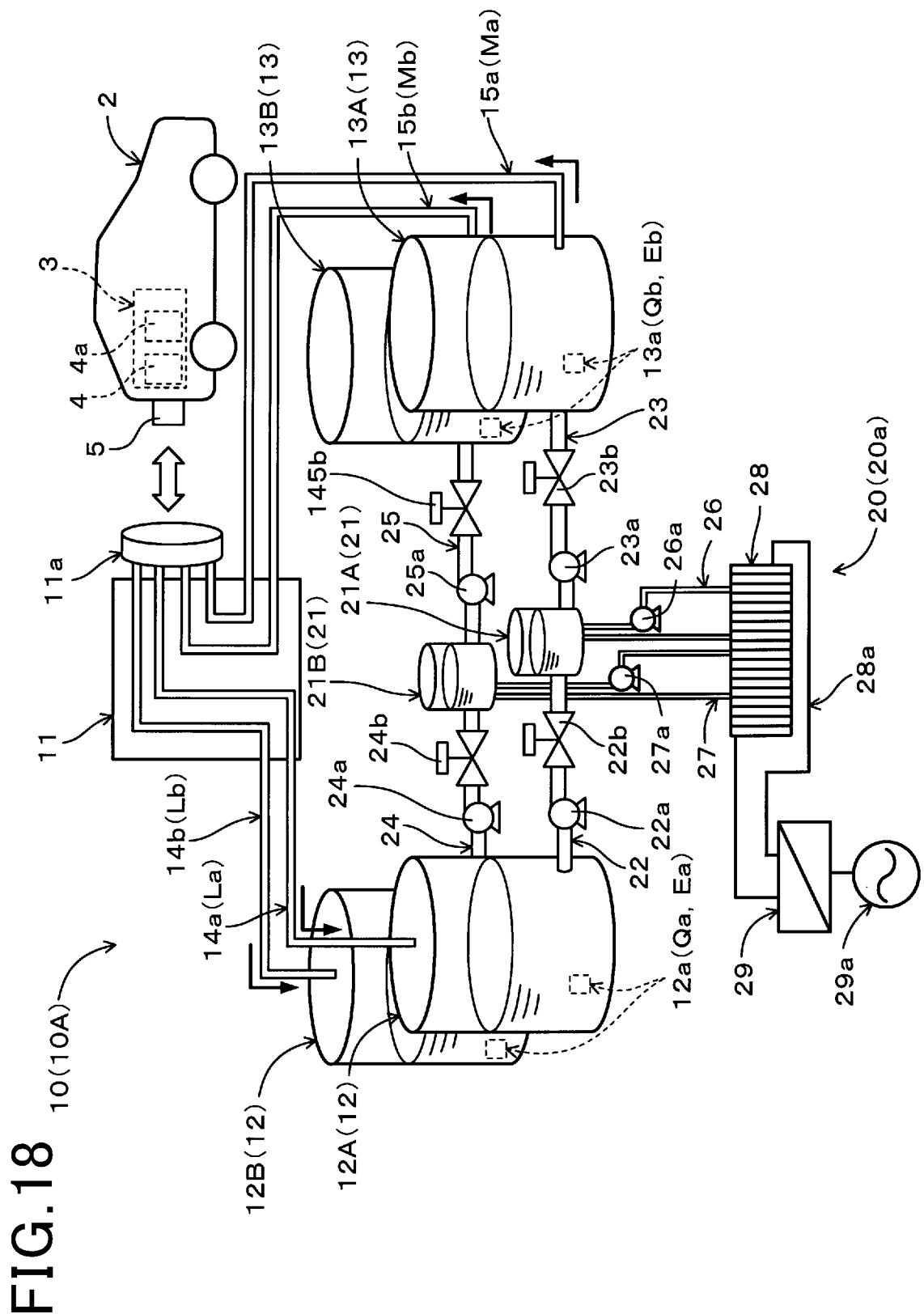
FIG. 18 is a diagram of an overall configuration of an electrolyte station in FIG. 17.

As shown in FIG. 18, the electrolyte station 10A includes a stand 11, two recovery tanks 12, two filling tanks 13, two recovery lines (flow passages) 14a and 14b, two filling lines (flow passages) 15a and 15b, and a charging processing apparatus 20.

The stand 11 includes a connector 11a that is used for electrolyte replacement. The connector 11a can be connected to a connection socket (connection opening) 5 that is connected to the electrolyte tank 4 of the redox flow battery 3. Respective one end portions of the two recovery lines 14a and 14b and respective one end portions of the two filling lines 15a and 15b are provided inside the connector 11a.

In addition, although not particularly shown in FIG. 18, a recovery pump and a filling pump are provided inside the stand 11. The recovery pump is used to send an electrolyte through the two recovery lines 14a and 14b towards the recovery tank 12. The filling pump is used to send an electrolyte through the two filling lines 15a and 15b towards the connector 11a.

The two recovery tanks 12 are classified into a recovery tank 12A and a recovery tank 12B. The recovery tank 12A stores a recovered electrolyte La in an anode-side electrolytic tank (not shown) of the electrolyte tank 4. The recovery tank 12B stores a recovered electrolyte Lb in a cathode-side electrolytic tank (not shown) of the electrolyte tank 4.

A sensor apparatus 12a is attached to each of the two recovery tanks 12. The sensor apparatus 12a includes a first sensor and a second sensor. The first sensor acquires data for measurement of a liquid amount Qa of the electrolyte that is stored in the recovery tank 12. The second sensor acquires data for measurement of an energy amount Ea of the electrolyte that is stored in the recovery tank 12. The pieces of data that are acquired by the sensors of the sensor apparatus 12a are transmitted to the management apparatus 30.

The two filling tanks 13 are classified into a filling tank 13A and a filling tank 13B. The filling tank 13A stores a charged electrolyte Ma that fills the anode-side electrolytic tank (not shown) of the electrolyte tank 4. The filling tank 13B stores a charged electrolyte Mb that fills the cathode-side electrolytic tank (not shown) of the electrolyte tank 4.

A sensor apparatus 13a that is similar to the above-described sensor apparatus 12a is attached to each of the two filling tanks 13. The sensor apparatus 13a includes a first sensor and a second sensor. The first sensor acquires data for measurement of a liquid amount Qb of the electrolyte that is stored in the filling tank 13. The second sensor acquires data for measurement of an energy amount Eb of the electrolyte that is stored in the filling tank 13. The pieces of data that are acquired by the sensors of the sensor apparatus 13a are transmitted to the management apparatus 30.

As the first sensors of the sensor apparatuses 12a and 13a, a capacitive level indicator, a float-type level indicator, an ultrasonic level indicator, a pressure-type level indicator, or the like can be typically used.

As the second sensors of the sensor apparatuses 12a and 13a, a pH sensor can be typically used. When the pH sensor is used as the second sensor, the energy amount Ea per unit liquid amount of the electrolyte can be estimated from a pH value that is detected by the pH sensor.

Here, the energy amount Eb can be derived by an estimation value of electric power that is supplied to the cell stack 28 being added to the energy amount Ea that is estimated by the second sensor of the sensor apparatus 12a. In this case, the second sensor of the sensor apparatus 13a can be omitted.

The recovery line 14a connects the connector 11a of the stand 11 and the recovery tank 12A. Therefore, in a state in which the connector 11a of the stand 11 is connected to the connection socket 5, the used electrolyte La that is removed from the electrolyte tank 4 is recovered into the recovery tank 12A from the connector 11a through the recovery line 14a.

The recovery line 14b connects the connector 11a of the stand 11 and the recovery tank 12B. Therefore, in a state in which the connector 11a of the stand 11 is connected to the connection socket 5, the used electrolyte Lb that is removed from the electrolyte tank 4 is recovered into the recovery tank 12B from the connector 11a through the recovery line 14b.

The filling line 15a connects the connector 11a of the stand 11 and the filling tank 13A. Therefore, in a state in which the connector 11a of the stand 11 is connected to the connection socket 5, the charged electrolyte Ma that is stored in the filling tank 13A fills the electrolyte tank 4 through the filling line 15a and the connector 11a.

The filling line 15b connects the connector 11a of the stand 11 and the filling tank 13B. Therefore, in a state in which the connector 11a of the stand 11 is connected to the connection socket 5, the charged electrolyte Mb that is stored in the filling tank 13B fills the electrolyte tank 4 through the filling line 15b and the connector 11a.

Here, the recovery lines 14a and 14b, and the filling lines 15a and 15b are paths that are independent of one another. Therefore, in a state in which the connector 11a of the stand 11 is connected to the connection socket 5 of the vehicle 2, a recovery operation of the used electrolytes La and Lb can be performed using the recovery lines 14a and 14b, and a filling operation of the charged electrolytes Ma and Mb can be performed using the filling lines 15a and 15b, in parallel. As a result, an amount of time required for an electrolyte replacement operation can be shortened.

Here, a structure in which at least one line among the four lines 14a, 14b, 15a, and 15b is also used as a portion or the entirety of another line can also be used as required.

In addition, the connector 11a may be divided into a first connector and a second connector. The first connector is used for the two recovery lines 14a and 14b. The second connector is used for the two filling lines 15a and 15b.

The charging processing apparatus 20 is capable of performing a charging process for charging the used electrolytes La and Lb that are stored in the recovery tanks 12A and 120B. The electrolyte that has been subjected to the charging process by the charging processing apparatus 20 is stored in the filling tanks 13A and 13B as the charged electrolytes Ma and Mb.

The charging processing apparatus 20 includes two charging tanks 21, the cell stack 28, a charger-discharger 29, and a control unit 20a.

The control unit 20a provides a function for controlling transfer pumps 22a, 23a, 24a, and 25a, circulation pumps 26a and 27a, and on-off valves 22b, 23b, 24b, and 25b, based on an electrolyte replacement condition. The electrolyte replacement condition is set such that the used electrolytes La and Lb are recovered from the redox flow battery 3 and the redox flow battery 3 is filled with the charged electrolytes Ma and Mb.

The two charging tanks 21 are classified into a charging tank 21A and a charging tank 21B. The charging tank 21A is respectively connected to the recovery tank 12A and the filling tank 13A by connection pipes 22 and 23. The charging tank 21B is respectively connected to the recovery tank 12B and the filling tank 13B by connection pipes 24 and 25.

The capacities of the charging tanks 21A and 21B are preferably a multiple or a divisor of the capacity of the electrolyte tank 4 of the redox flow battery 3. More preferably, the capacities of the charging tanks 21A and 21B are similar to the capacity of the electrolyte tank 4. As a result, a requirement for excessive electric power when the electrolytes in the charging tanks 21A and 21B are charged can be suppressed.

In addition, the capacities of the charging tanks 21A and 21B are preferably set to a value that is less than the capacity of any of the recovery tanks 12A and 120B, and the filling tanks 13A and 13B. As a result, the charging processing apparatus 20 including the charging tanks 21A and 21B can be reduced in size.

The connection pipe 22 connects the recovery tank 12A and the charging tank 21A. The electrolyte can be transferred between the recovery tank 12A and the charging tank 21A through the connection pipe 22.

The electrolyte can be transferred from the recovery tank 12A to the charging tank 21A or from the charging tank 21A to the recovery tank 12A by the on-off valve 22b being controlled to an open state by the control unit 20a and the transfer pump 22a being operated. In addition, the flow of electrolyte between the recovery tank 12A and the charging tank 21A is blocked by the on-off valve 22b being controlled to a closed state by the control unit 20a.

The connection pipe 23 connects the charging tank 21A and the filling tank 13A. The electrolyte can be transferred between the charging tank 21A and the filling tank 13A through the connection pipe 23.

The electrolyte can be transferred from the charging tank 21A to the filling tank 13A or from the filling tank 13A to the charging tank 21A by the on-off valve 23b being controlled to an open state by the control unit 20a and the transfer pump 23a being operated. In addition, the flow of electrolyte between the charging tank 21A and the filling tank 13A is blocked by the on-off valve 23b being controlled to a closed state by the control unit 20a.

The connection pipe 24 connects the recovery tank 12B and the charging tank 21B. The electrolyte can be transferred between the recovery tank 12B and the charging tank 21B through the connection pipe 24.

The electrolyte can be transferred from the recovery tank 12B to the charging tank 21B or from the charging tank 21B to the recovery tank 12B by the on-off valve 24b being controlled to an open state by the control unit 20a and the transfer pump 24a being operated. In addition, the flow of electrolyte between the recovery tank 12B and the charging tank 21B is blocked by the on-off valve 24b being controlled to a closed state by the control unit 20a.

The connection pipe 25 connects the charging tank 21B and the filling tank 13B. The electrolyte can be transferred between the charging tank 21B and the filling tank 13B through the connection pipe 25.

The electrolyte can be transferred from the charging tank 21B to the filling tank 13B or from the filling tank 13B to the charging tank 21B by the on-off valve 25b being controlled to an open state by the control unit 20a and the transfer pump 25a being operated. In addition, the flow of electrolyte between the charging tank 21B and the filling tank 13B is blocked by the on-off valve 25b being controlled to a closed state by the control unit 20a.

The cell stack 28 is a known reaction tank that is composed of an assembly of a plurality of cells that are capable of generating or absorbing electric power, similar to the electrolyte tank 4 of the redox flow battery 3. The cell stack 28 is capable of circulating the electrolyte between the charging tanks 21A and 21B through circulation paths 26 and 27. The circulation pumps 26a and 27a are provided on the circulation paths 26 and 27.

As a result, during operation of the circulation pump 26a, the electrolyte circulates through the circulation path 26 that connects the charging tank 21A and the cell stack 28. In addition, during operation of the circulation pump 26b, the electrolyte circulates through the circulation path 27 that connects the charging tank 21B and the cell stack 28. At this time, in the cell stack 28, electric power can be outputted through use of the electrolyte, or the electrolyte can be charged by input of electric power.

The charger-discharger 29 is configured as a charger-discharger for system power that is interposed between system power supply 29a and the cell stack 28 on an energization path 28a. Therefore, the charger-discharger 29 is capable of performing charging and discharge with the system power supply 29a through the energization path 28a.

The electrolyte is circulated through the circulation paths 26 and 27 in a power input state in which electric power is inputted from the system power supply 29a to the charger-discharger 29. Thus, the electric charge of the electrolyte is increased. Circulation of the electrolyte is continued in the power input state. Thus, liquid charging of the electrolyte in the charging tanks 21A and 21B can be performed.

Meanwhile, electric power that is stored in the cell stack 28 can be outputted to the system power supply 29a through the energization path 28a and the charger-discharger 29.

Figure 19:
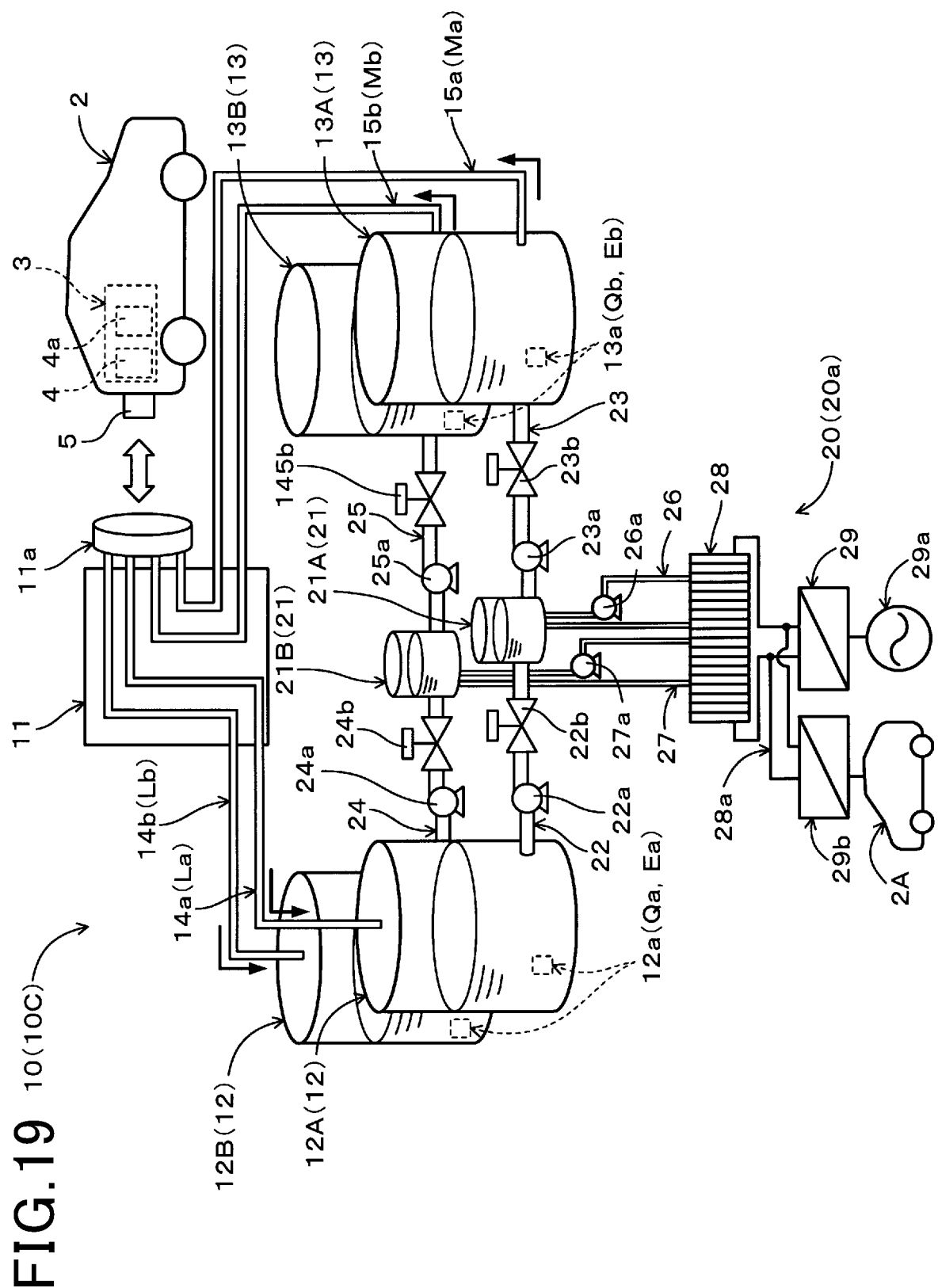
FIG. 19 is a diagram of a variation example of the electrolyte station in FIG. 18.

Here, at least one of the plurality of electrolyte stations 10A shown in FIG. 18 may be configured as an electrolyte station 10C, shown in FIG. 19, that is a combination charging and electrolyte station that provides a function for charging a secondary battery that is mounted to a connected vehicle 2A.

The charging processing apparatus 20 of the electrolyte station 100C includes a charger-discharger 29b, in addition to the charger-discharger 29. The charger-discharger 29b is configured as a charger-discharger for a vehicle. The charger-discharger 29b is used to perform charging and discharge with the connected vehicle 2 to which an external connection is made. The charger-discharger 29b includes a direct current-to-direct current (DC-DC) converter. The two chargers/dischargers 29 and 29b are connected in parallel to the cell stack 28.

Here, in the electrolyte station 10C, other apparatuses to which external connection is made can be provided in addition to the system power supply 29a and the connected vehicle 2, as apparatuses that are connected to the two chargers/dischargers 29 and 29b.

Next, an energy management method performed by the above-described management apparatus 30 will be described with reference to FIG. 17 and FIG. 20. The energy management method is a method for managing energy supply to the vehicle 2 to which the redox flow battery 3 is mounted. Specifically, the energy management method is a method for presenting the presented information to the user or the like. The method can also be referred to as an information presentation method for energy management.

Figure 20:
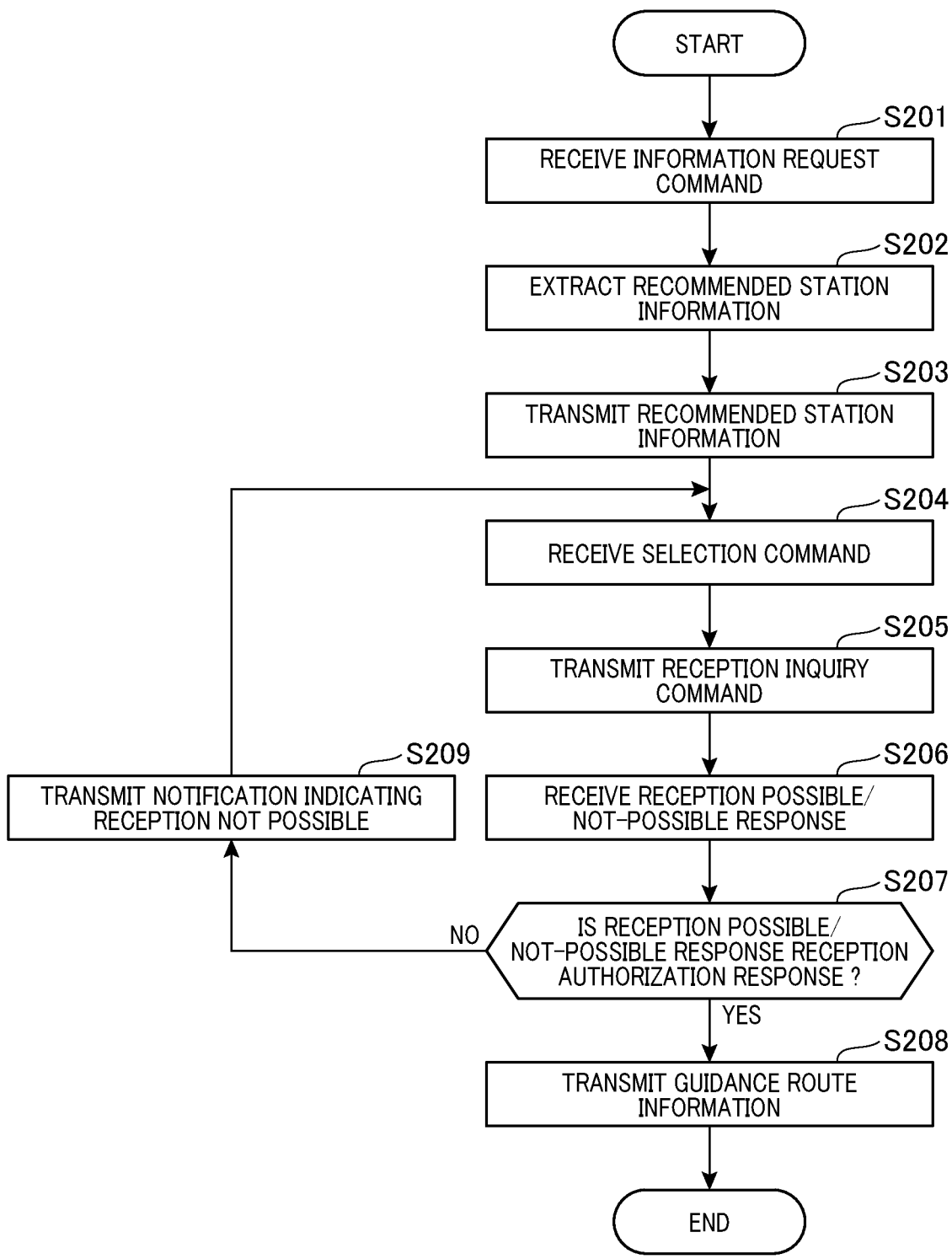
FIG. 20 is a flowchart of control process in an energy management apparatus according to the third embodiment.

As shown in FIG. 20, processes related to the energy management method include the processes at each step, from step S201 to step S209. These processes are performed by the management apparatus 30.

Here, one or a plurality of steps may be added to the foregoing steps as required. Alternatively, a plurality of steps may be integrated. In addition, the order in which the steps are performed may be changed as required.

At a first receiving step S201, the management apparatus 30 receives the information request command C1 from the terminal apparatus 50 of the user for the vehicle 2. At this time, information in which registration information of the user or the vehicle 2 is associated with the information request command C1 is transmitted to the management apparatus 30. At the first receiving step S201, the management apparatus 30 detects the information request from the terminal apparatus 50.

At the first receiving step S201, the information request command C1 is transmitted from the terminal apparatus 50 to the management apparatus 30 when energy supply to the vehicle 2 is determined to be required. At this time, the transmission may be controlled by the user managing the vehicle 2. Alternatively, the transmission may be controlled by the monitoring control apparatus (onboard apparatus 50C) mounted to the vehicle 2.

That is, when determined that energy supply is required by confirming the energy demand information of the vehicle 2, the information request command C1 can be transmitted to the management apparatus 30 by the operating unit 53 of the terminal apparatus 50 being operated by the the user.

Alternatively, when, in response to the monitoring control apparatus mounted to the vehicle 2 detecting the energy demand information, the detection value is determined to be outside a management range and energy supply is determined to be required, the information request command C1 can be automatically transmitted to the management apparatus 30.

At an extracting step S202, the management apparatus 30 extracts the recommended station information D3 that is the presented information that can be presented to the user, in response to reception of the information request command C1 at the first receiving step S201. At the extracting step S202, the management apparatus 30 extracts the recommended station information D3 is based on both the vehicle information D1 related to the vehicle 2 and the facility information D2 related to the plurality of energy supply stations 10.

The extracted recommended station information D3 may be information regarding a single recommended station 10R. However, to enable the user to make a selection, the recommended station information D3 is preferably information regarding a plurality of recommended stations 10R.

At the extracting step S202, in response to the transmission command C3 being outputted from the terminal apparatus 50 to the vehicle information server 70, the vehicle information D1 that is stored in the storage unit 72 of the vehicle information server 70 is transmitted to the management apparatus 30.

At a first transmitting step S203, the management apparatus 30 transmits the recommended station information D3 that is extracted at the extracting step S202 to the terminal apparatus 50. At the first transmitting step S203, the recommended station information D3 that is transmitted to the terminal apparatus 50 can be presented to the user.

When the first transmitting step S203 is performed, the selection command C2 regarding the recommended station 10R can be inputted by the user in the operating unit 53 of the terminal apparatus 50, based on the recommended station information D3.

At this time, when a plurality of recommended stations 10R are included in the recommended station information D3, any one of the plurality of recommended stations 10R can be selected by the user. Alternatively, an order of preference can be set by the user, and a plurality of recommended stations 10R can be selected by the user. Meanwhile, when only a single recommended station 10R is included in the recommended station information D3, the recommended station D3 can be selected through agreement by the user.

At a second receiving step S204, the management apparatus 30 receives the selection command C2 from the terminal apparatus 50, following the first transmitting step S203. At the second receiving step S204, the management apparatus 30 detects that selection of the recommended station 10R has been made through the terminal apparatus 50.

At a second transmitting step S205, the management apparatus 30 transmits the reception inquiry command T1 regarding the vehicle 2, together with the vehicle information D1 related to the vehicle 2, to the recommended station 10R selected by the user, in response to reception of the selection command C2. At the second transmitting step S205, the vehicle information D1 is associated with the reception inquiry command T1 of the vehicle 2, and the reception inquiry command T1, together with the vehicle information D1, is transmitted to the station management server 10a of the recommended station 10R.

When the second transmitting step S205 is performed, the station management server 10a of the recommended station 10R selected by the user determines whether reception of the vehicle 2 is possible. When determined that reception of the vehicle 2 is possible, the station management server 10a of the recommended station 10R transmits the reception authorization response T2 to the management apparatus 30 via the communication line N2. Meanwhile, when determined that reception of the vehicle 2 is not possible, the station management server 10a of the recommended station 10R transmits the reception not-possible response T3 to the management apparatus 30 via the communication line N2.

At a third receiving step S206, the management apparatus 30 receives a reception possible/not-possible response T2 or T3 regarding the vehicle 2 from the recommended station 10R selected by the user, in response to the reception inquiry command T1. At the third receiving step S106, the management apparatus 30 detects whether reception of the vehicle 2 is possible by the recommended station 10R.

At a determining step S207, the management apparatus 30 determines whether the reception possible/not-possible response T2 or T3 is the reception authorization response T2. When determined that the reception possible/not-possible response T2 or T3 is the reception authorization response T2 (YES at step S207), the management apparatus 30 proceeds to a third transmitting step S208. When determined otherwise (NO at step S207), the management apparatus 30 proceeds to a fourth transmitting step S209.

At the third transmitting step S208, when the reception authorization response T2 is received, the management apparatus 30 transmits the guidance route information D4 regarding the route to the recommended station 10R to the terminal apparatus 50. At the third transmitting step S208, the guidance route information D4 regarding the route to the recommended station 10R from which the reception authorization response T2 is received can be confirmed by the user in the terminal apparatus 50. The vehicle 2 can then be moved to the recommended station 10R based on the guidance route information D4 by the user.

At the fourth transmitting step S209, when the reception not-possible response T3 is received, the management apparatus 30 transmits a notification that the recommended station 10R selected by the user is unable to receive the vehicle 2, to the terminal apparatus 50. After performing the fourth transmitting step S209, the management apparatus 30 returns to the second receiving step S204 and waits until another recommended station 10R is selected by the user.

Here, as a variation example particularly related to the above-described energy management method, instead of the guidance route information D4 being transmitted to the terminal apparatus 50 at the third transmitting step S208, the guidance route information D4 of only the recommended station 10R from which the reception authorization command T2 has been received may be transmitted to the terminal apparatus 50.

In addition, instead of the processes from step S201 to step S209 being performed, only the processes from step S201 to step S203 may be performed.

According to the above-described third embodiment, working effects such as those below are achieved.

In the above-described energy management apparatus 30, the receiving unit 31 receives the information request command C1 from the terminal apparatus 50. In addition, the extracting unit 33 extracts the recommended station information D3 that can be referenced during use of a plurality of energy supply stations 10, in response to reception of the information request command C1 by the receiving unit 31. The recommended station information D3 extracted by the extracting unit 33 is then transmitted to the terminal apparatus 50 by the transmitting unit 32.

Here, the recommended station information D3 is extracted based on both the vehicle information D1 related to the vehicle 2 and the facility information D2 related to the plurality of energy supply stations 10. Therefore, the recommended station information D3 that is suitable for the vehicle 2 to which the redox flow battery 3 is mounted is presented in the terminal apparatus 50, taking into consideration both the conditions on the vehicle 2 side and the state on the energy supply station 10 side. During energy supply to the vehicle 2, the recommended station information D3 that is presented in the terminal apparatus can be presented to the user.

In the above-described terminal apparatus 50, the operating unit 53 is operated by the user, and the information request command C1 requesting the presented information is transmitted to the management apparatus 30. As a result, the recommended station information D3 in response to the information request command C1 is transmitted from the management apparatus 30. Therefore, the recommended station information D3 that is suitable for energy supply to the vehicle 2 can be referenced through the terminal apparatus 50.

When the terminal apparatus 50 is the stationary terminal 50A or the portable terminal 50B, the information request command C1 is transmitted to the management apparatus 30 by an individual owner or a business operator operating the operating unit 53 upon confirming a warning (a warning that energy supply is required) that is outputted from the vehicle 2 in the stationary terminal 50A or the portable terminal 50B. Alternatively, the information request command C1 is transmitted to the management apparatus 30 by the stationary terminal 50A or the portable terminal 50B automatically determining the above-described warning.

When the terminal apparatus 50 is the onboard apparatus 50C, the information request command C1 is transmitted to the management apparatus 30 by a passenger operating the operating unit 53 of an operating apparatus upon confirming the above-described warning inside the vehicle 2. Alternatively, the information request command C1 is transmitted to the management apparatus 30 by the monitoring control apparatus automatically determining the above-described warning. The passenger can acquire the presented information that is suitable for the vehicle 2 in which the passenger is aboard, by operating the operating unit 53 of the operating apparatus at an appropriate timing.

In the above-described energy management method, when the information request command C1 is received from the terminal apparatus 50 at the first receiving step S201, after the recommended station information D3 that can be referenced is extracted at the extracting step S202, the recommended station information D3 is transmitted to the terminal apparatus 50 at the first transmitting step S203. Therefore, the recommended station information D3 can be transmitted to the terminal apparatus 50 in response to the information request command C1 being received from the terminal apparatus 50.

Consequently, according to the above-described third embodiment, energy supply to the vehicle 2 to which the redox flow battery 3 is mounted can be managed.

According to the above-described third embodiment, the recommended station 10R that is suitable for the vehicle information D1 related to the vehicle 2 can be presented in the terminal apparatus 50. In addition, the guidance route information D4 regarding the route to the recommended station 10R can also be presented in the terminal apparatus 50.

According to the above-described third embodiment, before the guidance route information D4 regarding the route to the recommended station 10R is presented, an inquiry regarding whether the recommended station 10R can receive the vehicle 2 is made. Therefore, the guidance route information D4 regarding the route to the recommended station 10R that is confirmed to be capable of receiving the vehicle 2 can be presented in the terminal apparatus 50.

According to the above-described third embodiment, the management apparatus 30 can receive the vehicle information D1 from the vehicle information server 70 in response to the transmission command C3 that is outputted from the terminal apparatus 50.

According to the above-described third embodiment, the storage unit 34 of the management apparatus 30 can store the facility information D2 therein through cooperation with the station management server 70. Alternatively, the storage unit 34 can update the facility information D2 that is already stored therein.

Hereafter, other embodiments related to the above-described third embodiment will be described with reference to the drawings. Elements according to the other embodiments that are identical to those according to the above-described third embodiment are given the same reference numbers. Descriptions thereof are omitted.

Fourth Embodiment

Figure 21:
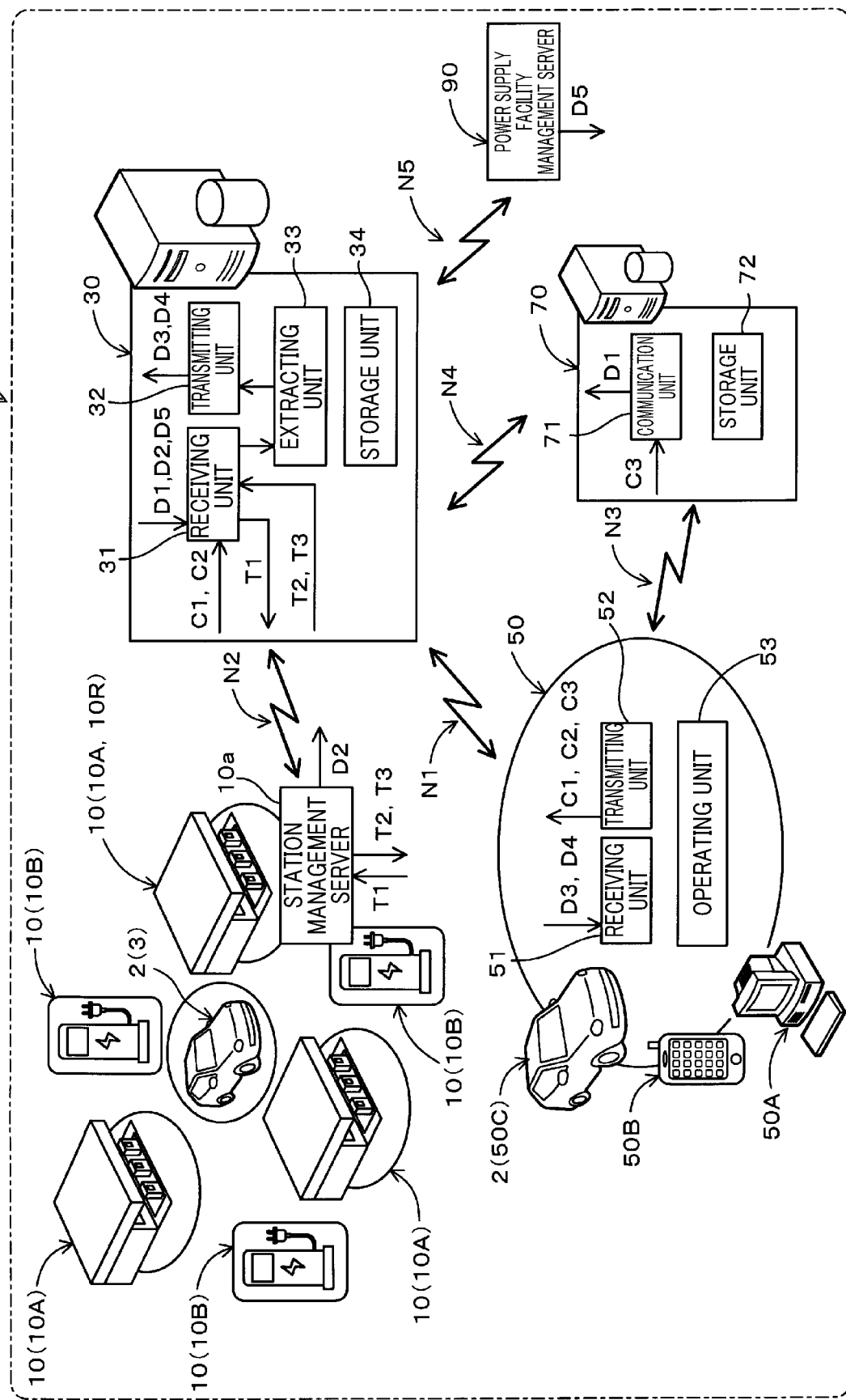
FIG. 21 is a configuration diagram of an energy management system according to a fourth embodiment.

As shown in FIG. 21, an energy management system 101 according to a fourth embodiment is the energy management system 1 according to the third embodiment to which a power supply facility management server 90 is further included.

The power supply facility management server 90 is provided in a power supply facility, such as a power plant. The power supply facility management server 90 transmits power information D5 to the management apparatus 30 via a communication line N5. The power information D5 is a part of the facility information D2 related to the energy supply stations 10.

As the power information D5, fields such as current value of energy supply amount [kWh], predicted value of energy supply amount [kWh], power selling price [yen], and primary energy source ratio can be typically provided.

Other configurations are similar to those according to the third embodiment.

Here, the power supply facility management server 90 may transmit the power information D5 to the station management server 10a of each energy supply station 10. In this case, the management apparatus 30 can receive the facility information D2 including the power information D5 from the station management server 10a.

According to the fourth embodiment, when the energy demand information in the vehicle information D1 includes fields such as desired power selling price [yen] and desired primary energy source ratio [%], the extracting unit 33 of the management apparatus 30 can perform a matching process between the facility information D2 and the vehicle information.

Other working effects are similar to those according to the third embodiment.

The present disclosure is not limited to the above-described typical embodiments. Various applications and modifications are possible without departing from the object of the present disclosure. For example, the following embodiments are possible through modification of the above-described embodiments.

According to the above-described embodiments, an example in which the energy management systems 1 and 101 include both the plurality of electrolyte stations 10A and 10C and the plurality of charging stations 10B is given. However, instead, only a plurality of electrolyte stations 10A and 10C may be included.

According to the above-described embodiments, an example in which the cell stack 28 is connected to each of the recovery tanks 12A and 12B and the filling tanks 13A and 13B with the charging tanks 21A and 21B of the charging processing apparatus 20 therebetween is given. However, instead, the charging tanks 21A and 21B may be omitted. A structure in which the cell stack 28 is connected to each of the recovery tanks 12A and 12B and the filling tanks 13A and 13B through connection pipes can be used.

According to the above-described embodiments, an example in which the electrolyte stations 10A and 10C include the charging processing apparatus 20 is given. However, the charging processing apparatus 20 of the electrolyte stations 10A and 10C can be omitted as required. In this case, the used electrolytes La and Lb that are recovered to the recovery tanks 12A and 12B are transferred to a charging facility outside the electrolyte station 10A and 10C, and charged. Subsequently, the charged electrolytes Ma and Mb fills the filling tanks 13A and 13B.

What is claimed is:

1. An electrolyte station for performing electrolyte replacement of a redox flow battery that is mounted to a vehicle, the electrolyte station comprising:
    a stand that includes a connector that connects to a connection socket that connects to an electrolyte tank in the redox flow battery;
    a recovery tank that stores a recovered electrolyte;
    a filling tank that stores a charged electrolyte;
    a recovery line that connects the connector in the stand and the recovery tank; and
    a filling line that connects the connector in the stand and the filling tank, wherein:
    in response to the connector in the stand being connected to the connection socket, (i) the electrolyte station enables a used electrolyte removed from the electrolyte tank to be recovered to the recovery tank through the recovery line, and (ii) the electrolyte station enables the charged electrolyte stored in the filling tank to be supplied to the electrolyte tank through the filling line;
    the electrolyte station further comprises a charging processing apparatus that performs a charging process on the used electrolyte that is recovered to the recovery tank, an electrolyte that has undergone the charging process in the charging processing apparatus being stored in the filling tank as the charged electrolyte; and
    the charging processing apparatus includes
        a charging tank that is connected to each of the recovery tank and the filling tank by a connection pipe in which a transfer pump and an on-off valve are provided,
        a cell stack that circulates the electrolyte to and from the charging tank through a circulation path in which a circulation pump is provided,
        a charger-discharger that is interposed between an external connection subject and the cell stack on an energization path, and
        a control unit that controls the transfer pump, the circulation pump, and the on-off valve based on an electrolyte replacement condition that is set to recover the used electrolyte from the redox flow battery and fill the redox flow battery with the charged electrolyte.
2. The electrolyte station according to claim 1, wherein:
    a capacity of the charging tank is set to a value that is expressed by a multiple or a divisor of a capacity of the electrolyte tank in the redox flow battery.
3. The electrolyte station according to claim 2, wherein:
    the capacity of the charging tank is set to a value that is less than individual capacities of the recovery tank and the filling tank.
4. The electrolyte station according to claim 1, wherein:
    the external connection subject includes a system power supply and a connected vehicle;
    the charger-discharger includes a system-power charger-discharger that performs charging and discharge with the system power supply and a vehicle charger-discharger that performs charging and discharge with the connected vehicle; and
    the system-power charger-discharger and the vehicle charger-discharger are connected in parallel to the cell stack.
5. An electric power management system comprising:
    an electrolyte station for performing electrolyte replacement of a redox flow battery that is mounted to a vehicle; and
    a management apparatus that manages the electrolyte station, wherein:
    the electrolyte station includes:
        a stand that includes a connector that connects to a connection socket that connects to an electrolyte tank in the redox flow battery;
        a recovery tank that stores a recovered electrolyte;
        a filling tank that stores a charged electrolyte;
        a recovery line that connects the connector in the stand and the recovery tank;
        a filling line that connects the connector in the stand and the filling tank; and
        a charging processing apparatus that performs a charging process on a used electrolyte that is recovered to the recovery tank,
    in response to the connector in the stand being connected to the connection socket, (i) the electrolyte station enables the used electrolyte removed from the electrolyte tank to be recovered to the recovery tank through the recovery line, and (ii) the electrolyte station enables the charged electrolyte stored in the filling tank to be supplied to the electrolyte tank through the filling line,
    an electrolyte that has undergone the charging process in the charging processing apparatus is stored in the filling tank as the charged electrolyte,
    the charging processing apparatus includes
        a charging tank that is connected to each of the recovery tank and the filling tank by a connection pipe in which a transfer pump and an on-off valve are provided,
        a cell stack that circulates the electrolyte to and from the charging tank through a circulation path in which a circulation pump is provided,
        a charger-discharger that is interposed between an external connection subject and the cell stack on an energization path, and
        a control unit that controls the transfer pump, the circulation pump, and the on-off valve based on an electrolyte replacement condition that is set to recover the used electrolyte from the redox flow battery and fill the redox flow battery with the charged electrolyte, and
    the management apparatus includes
        a power amount predicting unit that predicts each of (i) an input power amount of electric power, which is inputted from the external connection subject to the charger-discharger, and (ii) an output power amount of electric power, which is outputted from the charger-discharger to the external connection subject, a filling amount predicting unit that predicts a filling amount of the charged electrolyte that fills the electrolyte tank in the redox flow battery from the filling tank, a measuring unit that measures (i) a liquid amount and an energy amount of the used electrolyte that is stored in the recovery tank and (ii) a liquid amount and an energy amount of the charged electrolyte that is stored in the filling tank, and a condition setting unit that sets the electrolyte replacement condition based on (i) a prediction result from the power amount predicting unit, (ii) a prediction result from the filling amount predicting unit, and (iii) measurement results from the measuring unit.

6. An energy management apparatus that manages energy supply to an electric vehicle to which a redox flow battery is mounted, the energy management apparatus comprising:

a receiving unit that receives an information request command from a terminal apparatus;

an extracting unit that, in response to reception of the information request command by the receiving unit, extracts presented information based on both (i) vehicle information related to the electric vehicle and (ii) facility information related to a plurality of energy supply stations that include a plurality of electrolyte stations that are capable of performing electrolyte replacement in the redox flow battery; and a transmitting unit that transmits the presented information extracted by the extracting unit to the terminal apparatus.

7. The energy management apparatus according to claim 6, wherein:

the extracting unit extracts recommended station information related to a recommended station that is recommended for the electric vehicle among the plurality of energy supply stations, as the presented information.

8. The energy management apparatus according to claim 7, wherein:

the receiving unit receives a selection command regarding the recommended station based on the recommended station information from the terminal apparatus; and the transmitting unit transmits, to the terminal apparatus, guidance route information regarding a route to the recommended station when, after transmitting a reception inquiry command regarding the electric vehicle, together with the vehicle information related to the electric vehicle, to the recommended station in response to reception of the selection command by the receiving unit, the receiving unit receives a reception authorization response regarding the electric vehicle from the recommended station in response to the reception inquiry command.

9. The energy management apparatus according to claim 6, wherein:

the receiving unit is capable of connecting to a vehicle information server that manages the vehicle information, the receiving unit connects to the vehicle information server in response to a transmission command that is outputted from the terminal apparatus to the vehicle information server when the information request command is received from the terminal apparatus, and the receiving unit receives the vehicle information from the vehicle information server.

10. The energy management apparatus according to claim 6, further comprising:

a storage unit that is capable of storing information therein, wherein the receiving unit receives the facility information from a station management server that is provided in each of the plurality of energy supply stations; and the storage unit stores therein the facility information received by the receiving unit in cooperation with the station management server, or the storage unit updates the facility information that is already stored therein.

11. The energy management apparatus according to claim 10, wherein:

the plurality of energy supply stations include the plurality of electrolyte stations and a plurality of charging stations; and the storage unit stores therein both (i) facility information related to the plurality of electrolyte stations and (ii) facility information related to the plurality of charging stations as the facility information.

12. An energy management system comprising:

an energy management apparatus that manages energy supply to an electric vehicle to which a redox flow battery is mounted, the energy management apparatus including a receiving unit that receives an information request command from a terminal apparatus, an extracting unit that, in response to reception of the information request command by the receiving unit, extracts presented information based on both (i) vehicle information related to the electric vehicle and (ii) facility information related to a plurality of energy supply stations that include a plurality of electrolyte stations that are capable of performing electrolyte replacement in the redox flow battery, and a transmitting unit that transmits the presented information extracted by the extracting unit to the terminal apparatus;

a vehicle information server that is capable of transmitting the vehicle information to the receiving unit of the energy management apparatus; and a station management server that is provided in each of a plurality of energy supply stations and is capable of transmitting the facility information to the receiving unit of the energy management apparatus.

13. A terminal apparatus that acquires presented information regarding energy supply to an electric vehicle to which a redox flow battery is mounted, wherein:

the presented information is extracted based on both (i) vehicle information related to the electric vehicle and (ii) facility information related to a plurality of energy supply stations that include a plurality of electrolyte stations that are capable of performing electrolyte replacement in the redox flow battery; and the terminal apparatus includes a transmitting unit that transmits an information request command requesting the presented information to an energy management apparatus, and a receiving unit that receives the presented information that is transmitted from the energy management apparatus in response to the information request command.

14. The terminal apparatus according to claim 13, wherein:

the receiving unit receives, from the energy management apparatus and as the presented information, recommended station information related to a recommended station that is recommended for the electric vehicle among the plurality of energy supply stations.

15. The terminal apparatus according to claim 13, wherein:
the transmitting unit transmits to the energy management apparatus a selection command regarding the recommended station based on the recommended station information; and
the receiving unit receives, from the energy management apparatus, guidance route information regarding a route to the recommended station when the energy management apparatus receives a reception authorization response regarding the electric vehicle from the recommended station.

16. The terminal apparatus according to claim 13, wherein:
the transmitting unit transmits a transmission command to a vehicle information server such that the vehicle information server transmits vehicle information related to the electric vehicle to the energy management apparatus.

17. The terminal apparatus according to claim 13, wherein:
the terminal apparatus is an onboard apparatus that is mounted to the electric vehicle.

18. An energy management method for managing energy supply to an electric vehicle to which a redox flow battery is mounted, the energy management method comprising:
a receiving step of receiving an information request command from a terminal apparatus;
an extracting step of, in response to reception of the information request command at the receiving step, extracting presented information based on both (i) vehicle information related to the electric vehicle and (ii) facility information related to a plurality of energy supply stations that include a plurality of electrolyte stations that are capable of performing electrolyte replacement in the redox flow battery; and
a transmitting step of transmitting the presented information extracted at the extracting step to the terminal apparatus.

19. The energy management method according to claim 18, wherein:
the extracting step is a step of extracting, as the presented information, recommended station information related to a recommended station that is recommended for the electric vehicle among the plurality of energy supply stations; and
when the receiving step is a first receiving step and the transmitting step is a first transmitting step, the energy management method includes
a second receiving step of receiving after the first transmitting step a selection command regarding the recommended station based on the recommended station information from the terminal apparatus,
a second transmitting step of transmitting a reception inquiry command, together with the vehicle information related to the electric vehicle, to the recommended station in response to reception of the selection command,
a third receiving step of receiving a reception possible/not possible response regarding the electric vehicle from the recommended station in response to the reception inquiry command, and
a third transmitting step of transmitting, to the terminal apparatus and when a reception authorization response is received as the reception possible/not-possible response, guidance route information regarding a route to the recommended station.

* * * * *